United States Patent
Stanfield

(10) Patent No.: US 6,856,598 B1
(45) Date of Patent: Feb. 15, 2005

(54) COMMUNICATIONS SYSTEM

(76) Inventor: David Stanfield, 8th floor, 234B, Ave. Winston Churchill, 8-1180, Brussels (BE)

(*) Notice: Subject to any disclaimer, the term of this patent is extended or adjusted under 35 U.S.C. 154(b) by 0 days.

(21) Appl. No.: 09/485,658

(22) PCT Filed: Aug. 12, 1998

(86) PCT No.: PCT/GB98/02423
§ 371 (c)(1),
(2), (4) Date: Feb. 14, 2000

(87) PCT Pub. No.: WO99/09752
PCT Pub. Date: Feb. 25, 1999

(51) Int. Cl.[7] .............................. H04L 12/66; H04J 3/16; H04J 3/22; H04M 3/42; H04M 7/00
(52) U.S. Cl. ...................... 370/235; 370/352; 370/467; 379/209; 379/221; 379/230
(58) Field of Search ................................ 370/230, 235, 370/351, 352, 354, 356, 395, 410, 430, 461, 465, 466, 467, 114, 130, 219; 379/220, 221, 229, 230, 130, 219, 207, 216

(56) References Cited

U.S. PATENT DOCUMENTS

| | | | | |
|---|---|---|---|---|
| 4,565,903 A | * | 1/1986 | Riley | 379/221.02 |
| 4,866,763 A | * | 9/1989 | Cooper et al. | 379/221.02 |
| 5,420,914 A | | 5/1995 | Blumhardt | 379/114 |
| 5,444,774 A | * | 8/1995 | Friedes | 379/266.01 |
| 5,473,630 A | | 12/1995 | Penzias et al. | 375/114 |
| 5,473,679 A | | 12/1995 | La Porta et al. | 379/201 |
| 5,563,939 A | * | 10/1996 | La Porta et al. | 379/221.02 |
| 5,566,235 A | * | 10/1996 | Hetz | 379/221.02 |
| 5,574,783 A | | 11/1996 | Dunn | 379/230 |
| 5,943,408 A | * | 8/1999 | Chen et al. | 379/216.01 |
| 6,434,228 B1 | * | 8/2002 | Antrim et al. | 379/207.03 |
| 6,563,918 B1 | * | 5/2003 | Nelson et al. | 379/230 |
| 6,643,282 B1 | * | 11/2003 | Christie | 370/352 |
| 6,697,480 B2 | * | 2/2004 | Plunkett et al. | 379/221.02 |
| 6,704,327 B1 | * | 3/2004 | Gardner et al. | 370/467 |

FOREIGN PATENT DOCUMENTS

| | | |
|---|---|---|
| EP | 0608066 A2 | 7/1994 |
| GB | 2312594 | 10/1997 |
| WO | WO 94/13109 | 6/1994 |

OTHER PUBLICATIONS

"Open Access To The Intelligent Network: The Road To More Flexible And Responsive Services", Tyheus et al., vol. 226, No. 18.

"Direct Signaling: A New Access Signaling Architecture", La Porta et al., Communications—Gateway to Globalization, Proceedings of the International Conference on Communications, vol. 1, pp. 93–98.

David Stanfield Information Disclosure letter of Feb. 9, 2000.

* cited by examiner

Primary Examiner—Man Phan

(57) ABSTRACT

In a communication network where a subscriber is connected to switches in an originating carrier communications are routed to and/or from the subscriber via at least one communications carrier selected from a plurality of possible communications carriers. Communications control signals associated with outgoing and/or incoming communications are received from the switch at a controller external to the originating carrier. The communications control signals are processed at the controller in dependence upon directions from a third party using information on communications costs for each of the possible communications carriers to select at least one communications carrier for routing communications based on the information on communications cost to generate process communications control signals for routing the communications in accordance with the selection. Process communication control signals will then return to the switch in the originating carrier and the communications from and/or to the subscriber are switched to route the communications via the or each selected communications carrier in accordance with the process communications control signals.

78 Claims, 8 Drawing Sheets

FIG. 4

COMMUNICATIONS SYSTEM

FIELD OF THE INVENTION

The present invention relates to a method of controlling communications over a communications network and a communication control system.

BACKGROUND TO THE INVENTION

In a telecommunications network comprising a plurality of interconnected carrier networks, a subscriber is connected to a local loop provider who can actively control the access that the subscriber has to the networks. The provider of this local loop has been able to effectively control this 'gateway' to the subscriber to act as an effective tollgate to the subscriber. (Although generally fixed network examples are used, a very similar scenario exists for mobile network operators who operate a similar 'tollgate' for their subscribers). Over recent history there has been regulatory action to curb the power of the local loop providers. In the UK for example indirect access has been offered whereby a subscriber can prefix a dialled number with a '1XXX' code to indicate which carrier the call is to be routed over (dialling parity is not achieved). In Canada equal access is offered where the subscriber can order services from a particular carrier. Information from that carrier is relayed on a magnetic tape to the subscriber's local loop provider who then programs their end office exchange to route all inter-exchange calls via this selected carrier.

U.S. Pat. No. 5,566,235 discloses a method of allowing a customer to access services provided by carriers other than the one to which the customer is connected. A mediation point in the local exchange carrier's network determines which of a plurality of alternative carrier databases are to be used for processing a call. Since the mediation point in this system is still part of the local exchange carrier's network, there is no control of communications which is independent to the local loop provider; and there is no independent controller directed by a third party such as an independent service provider.

U.S. Pat. No. 5,473,630 discloses a method for use by equipment which routes a telephone call to reduce costs. This equipment, such as a customer's PBX or a local exchange carrier's telephone exchange, obtains from at least one telecoms carrier, the tariff information applicable for the call, and the equipment then selects the carriers as a function of the tariff and routes the call. The disadvantage with this method is that the call-by-call selection of the carrier is made either within the Customer Premises Equipment (CPE), necessitating certain types of CPE and possibly necessitating communication links between the CPE and the inter-exchange carriers that could be used, or within the local exchange, putting the selection ability and range of carriers that could be offered within the control of the local exchange carrier. As the number of alterative carriers increases, the first method becomes inefficient and restricts the number of customers where this method is economically viable, and the second method maintains the effective control within the local exchange carrier.

Although the prior art systems provide some form of control for a subscriber, they do not provide a generally accessible system whereby a subscriber can, whilst maintaining dialling parity, control the routing of their communication by control means that are independent of the local exchange carrier or mobile carrier to which they subscribe.

Were a subscriber able to achieve this, they would be able to have their call-by-call routing controlled for them by a service provider independent of the local exchange carrier (i.e. an independent third party carrier), thus gaining access to potentially lower cost structures which could be based on 'cost plus' accounting, where the origination costs (and in some cases termination costs) are regulated interconnect charges and the onward transit costs are effectively controlled by competition. Competitive long-distance or international carriers could also make use of such a system again without the necessity for special customer premises equipment (CPE) or customer network access equipment (CNAE), by directing the use of their own network and switching equipment for only those calls where the use of that network and/or switching equipment made economic sense, and directing the use of other carrier's networks for other calls. Competitive market entry will be encouraged by gaining such access to potential subscribers. These benefits singly or combined would have the effect of lowering subscribers' call charges, and would assist achieving the regulators stated goals of offering the customer greater choice, lower cost, and better service.

SUMMARY OF THE INVENTION

The present invention has been developed to overcome the limitations of the prior art and comprises a method of routing communications from and/or to a subscriber connected to communications switching means in an originating carrier via at least one communications carrier selected from a plurality of possible communications carriers, the method comprising the steps of: receiving communications control signals associated with outgoing and/or incoming communications from said communications switching means at control means external to said originating carrier; processing said communications control signals at said control means in dependence upon directions from a third party using information on communications costs for each of the possible communications carriers to select at least one communications carrier for routing communications based on said information on communication costs and to generate processed communications control signals for routing the communications in accordance with the selection; returning the processing communications control signals to said switching means in said originating carrier; and switching the communications from and/or to the subscriber, to route the communications via the or each selected communications carrier in accordance with the processed communications control signals.

The present invention also provides a communications control system for routing communications from and/or to a subscriber connected to communications switching means in an originating carrier via at least one other communications carrier selected from a plurality of possible communications carriers, the system being external to said originating carrier and comprising: receiving means for receiving communications control signals associated with outgoing and/or incoming communications from said communications switching means; processing means for processing said communications control signals in dependence upon directions from a third party and using information on communications costs for each of the possible communications carriers to select at least one communications carrier for routing communications based on said information on communication costs and to generate processed communications control signals for routing the communications in accordance with the selection; and means for returning the processed communications control signals to the switching means in said originating carrier to switch the communications from and/or to the subscriber and route the communications via the or each selected communications control carrier in accordance with the processed communications control signals.

Another aspect of the present invention provides a method of routing communications from and/or to a subscriber connected to communications switching means in an originating carrier via at least one communications carrier selected from a plurality of possible communications carriers, the method comprising the steps of: generating information for processing outgoing and/or incoming communications control signals in dependence upon direction from a third party and using information on communications costs for each of the possible communications carriers at control means external to the originating carrier; passing the generated information to a controller in the originating carrier; receiving communications control signals associated with communications from said communications switching means at said controller; processing said communications control signals at said controller using the generated information to select at least one communications carrier for routing communications to the destination based on the information on communication costs and to generate processed communications signals for routing the communications in accordance with the selection; returning the processed communications control signals to said communications switching means in said originating carrier; and switching the communications from and/or to the subscriber to route the communications via the or each selected communications carrier in accordance with the processed communications control signals.

A further aspect of the present invention provides a communications control system for routing communications from and/or to a subscriber connected to communications switching means in an originating carrier to a destination via at least one communications carrier selected from a plurality of possible communications carriers, the system being independent to said originating carrier and comprising: means for generating information for processing outgoing and/or incoming communications control signals in dependence upon directions from a third party and using information on communications costs for each of the possible communications carriers; and means for passing the generated information to a controller in the originating carrier; whereby the controller receives communications control signals associated with communications from said communications switching means, processes said communications control signals using the generated instructions to select at least one communications carrier for routing communications to the destination based on information on communications costs and to generate processed communications signals for routing the communications in accordance with the selection, and returns the processed communications control signals to said communications switching means in said originating carrier, and the communications from and/or to the subscriber are switched to route the communications via the or each selected communications carrier in accordance with the processed communications control signals.

In the brief statements of the invention given above, and the description hereinafter, the switching means can comprise any telecommunications device or devices capable of providing the necessary functionality (i.e. controlling the routing of communications signals in either aggregated form (e.g. circuit switched voice calls) or disaggregated form (e.g. IP packets or ATM cells)). The switching means could thus comprise a switch or a router for example. Further, a carrier can comprise any arrangement capable of carrying telecommunications traffic e.g. a telecommunications network.

The present invention is applicable to any form of telecommunications and is not limited to voice signals. Typically telecommunications networks carry facsimile data and other forms of digital data generated for example by modems or by other digitisation means. The communications signals can therefore comprise any type of information, for example text, audio, video, images and multimedia. The present invention is thus applicable to communications over IP-based networks such as the Internet in order to control the routing of communications based on directions from a third party.

The third party can comprise at least one of a user, a subscriber, a communication service provider, and a communications network operator. Thus the present invention allows a user, a subscriber, or a service provider acting on behalf of a subscriber for example to control the way in which outgoing communications are processed i.e. routed on a call by call basis in order to select carriers which cost the least, without the need to add a dialling prefix for outgoing calls.

The processing to be carried out as a function of cost is dependent upon the directions from the third party and these can either be indirect i.e. the operator of the control means can set up the control means to operate in accordance with the wishes of the third party, thus saving the third party time, or direct access can be provided to the control means to allow the third party to set up the processing required, facilitating faster provisioning of more complex services or changes to service/routing options. Such a direct accessing facility can be provided by allowing a subscriber to dial in to the communication control means in order to set up the processing required. Of course suitable security measures will need to be taken with such a direct facility e.g. password verification, calling line identity verification, encryption, etc.

In one embodiment all of the communications control signals from calls associated with the subscriber are directed from the switching means to the control means, for simplicity of implementation. Alternatively, the switching means is programmed to identify particular communications to be processed by the control means so only these can be directed to the control means for processing. This would have the effect of increasing the efficiency of the interactions between the control means and the switching means, reducing the number of transactions and offering the potential for further cost reduction. The identification of the communications can, in an Advanced Intelligent Network (AIN) implementation, comprise any suitable AIN trigger point. The control means can include a database which is used for the processing of the communication signals. The database can include cost information for the possible carriers which can be used to route communication, and subscriber specific information.

In these embodiments of the present invention, an independent service provider for example can effectively take control of outgoing and incoming calls on behalf of a subscriber according to a set of enhanced services as agreed with and sold to the subscriber. By means of information included in the initial communication control signals or in subsequent communication control signals, the operator of the control means and thus a service provider or communications network operator directing the control means will also have the information with which to be able to charge the subscriber for calls that are so controlled. The present invention can be embodied using Intelligent Network (IN) or Advanced Intelligent Network (AIN) architectures, (where the switching means include one or more SSPs and the control means include one or more SCPs), although in the future, methods such as Information Networking Architecture (INA) and Telecommunications Information Network Architecture (TINA) may also be used. The ability of a third party to access this intelligence controlling the communications network or networks via an independent control point or controller allows the third party such as a subscriber to configure and set up their own intelligent services according to their specific communication requirements. Other embodiments not based on AIN/IN architectures are also possible, using signalling systems such as SS7 (and its geographic variations at both standards and implementation levels) and ISDN, singly, or in combination (with the appropriate translation mechanisms), and another alternative embodiment involves providing the control means with voice switching capability, and attempted call set-ups direct to the control means and using call deflection or call drop back type functions to reroute the call (although this last embodiment is less efficient on the use of network resources); and some present or possible future embodiments may combine architectures and signalling systems. The carriers can comprise a mix of different types of carriers e.g. a mobile network and a conventional fixed network.

In one embodiment the communication control signals are sent to the control point and then processed and then returned to the switching point which then routes the call. This will typically only involve one query signal and one return signal, and the control point may then effectively release control of the communication. Alternatively, in another embodiment, the control point retains control of the communication, and can carry out further call processing on receipt of further communications control signals. This may be used for providing more complex services and/or to assist in the provision of end-to-end routing control and/or for billing purposes.

In one embodiment, for most applications it is envisaged that the control point will solely control the processing of the call. Alternatively, the control point may communicate with other like control means in order to provide control signals to switching means in one or more communication networks. This may be used for example in providing more complex services or assisting in providing end-to-end routing control.

In one embodiment, the control point is located outside the originating carrier's network, and receives communication control signals from and returns processed communication control signals associated with a subscriber's calls to a switching point in the originating carrier's network. Alternatively, and before the service can be used or as part of the provisioning process, the abovementioned external control point generates "global" information such as routing translation information for example that is passed to a controller in the originating carrier, so that when the least cost routing service for example is used, the communication control signals are sent instead to the originating carrier's controller, which then carries out the communication control signal processing according to the "global" information that has been passed to it by the external control point. This second controller then performs the function of passing the processed communication control signals back to the switching point. Call-by-call signals between the originating network and the external control point could therefore be eliminated for simple services, and the communication between the external control point and the originating carrier then covers such items as changes to the subscribers service profile, changes to the routing translation information, and billing information (this last item generally happening in a "batch" mode). This alternative approach can in certain circumstances be more efficient, by reducing the amount of signalling traffic outside the originating carrier's network. A similar scenario exists for the control of incoming calls. This alternative approach may also be implemented using a number of different network architectures and signalling systems, and it should be noted that the alternative control architecture as described may be similarly used to interface with many carriers, and not just the originating carrier.

The previous embodiments have focused on an external control point controlling the routing of calls from switching means in an originating carrier. In normal routing scenarios, once the call has left the originating carrier and reaches the next carrier in the route, subsequent routing is generally within the next carrier's control. An alternative embodiment involves the step of sending communication control signals to switching means in other carriers used for the communication to the destination, and for those switching means to then route the communication in accordance with the communication control signals. These communication control signals could emanate either from the external control point and be sent directly to the other carriers switching means; or alternatively the processed communications control signals (returned by the control point to the switching means in the originating carrier) include control signals or routing information for the switching means in the other carriers to be used in the communication to the destination. In this last case, an additional feature is for control signals or routing information sent to a first of the other carriers to be passed by that carrier to a second carrier, and then by the second carrier to the third, and so on. By these means or a combination of the above means, full end-to-end routing control can be achieved, offering the potential for further lowering costs. Ideally this end-to-end routing would be achieved without sending any additional communication control signals to the original control point, and such signals or routing information will simply be included as additional information in the messages that have to be sent to route the call in a normal scenario. This would have the effect of achieving this end-to-end routing without very significantly increasing the signalling overhead. The routing information referred to above could be as simple as a series of prefixes on the called party number, or could be more complex. The current state of internetwork communication protocol implementations do not allow for this "daisy chaining", but it would be helpful if international signalling standards were modified to allow for additional addressing or routing information to be included. Simple prefixes are proposed, for example by British Telecommunications plc in their planned 'targeted transit' service, whereby an originating carrier who wishes to use BT as a transit carrier can prefix the dialled number with 4 digits in the format 7XXX to indicate which carrier they would like to onward route their calls after they leave the BT network. This to a degree opens up British Telecom's "service addressing" function to be used by interconnecting carriers. In these scenarios, billing information from the originating carrier and/or the other carriers may either be passed to the external control point on a call-by-call basis or in batch mode, and either via direct links or on magnetic tape or paper, and may emanate from any one or more of the carriers used in the communication route.

The routing services described above may also be used in a 'guesting' context, where a subscriber wishes to access such services whilst a 'guest' on another subscriber's facilities, which could be on the same network or another network. In this case, the first subscriber registers their presence with the control point, for example by dialling a special access number (which could either be a short access code or a standard format telephone number) and keying a specific account code and Personal Identification Number (PIN), and keying further responses to a series of voice prompts. The control means, if it recognises the Calling Line Identity of the second subscriber's line (if not the control means will prompt the user to enter the calling line number), will then register the subscriber's location, and download new service trigger information or preprogramming information into the switching means associated with the second subscriber's facilities or connection. (Depending on the switch capability, the new trigger information need not over-write any previously existing trigger information, but be stored in additional space within the switch.) In this scenario, the control means sends back routing information appropriate to the subscriber's guest location, so that the cost-based routing function for example selects carriers for routing outgoing calls appropriate to that guest location (which could as noted above be connected to a different network from the subscriber's home network). The guest subscriber can deregister or be deregistered through a number of alternative means.

(1) Again by dialling the special access number and entering the account code and PIN and following another series of voice prompts.
(2) An automatic 'time-out' which could be set at the time of guest registration.
(3) The guest subscriber registering at either their home subscriber connection or a third subscriber connection.
(4) The second subscriber following the deregistration voice prompts to deregister the guest.

These means allowing the guesting subscriber to access their normal services from secondary locations or facilities, and allow a second subscriber to provide their facilities for such a purpose whilst being able to over-ride this guesting if required.

BRIEF DESCRIPTION OF DRAWINGS

Embodiments of the present invention will now be described with reference to the accompanying drawings, in which:

FIG. 4 is a detailed diagram of a third embodiment of the present invention;

DETAILED DESCRIPTION OF EMBODIMENTS

Figure 1:
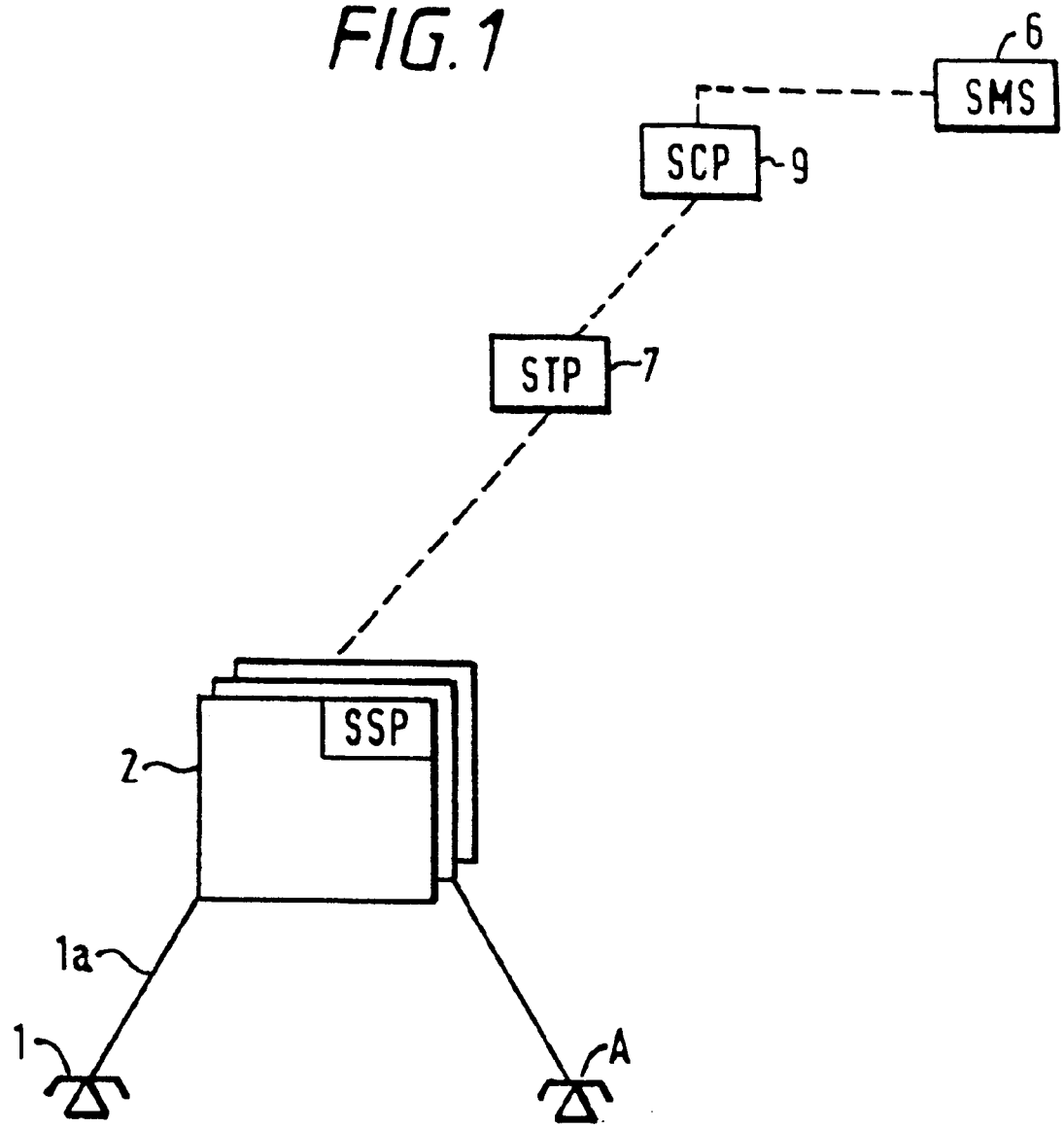
FIG. 1 is a diagram of an intelligent network in accordance with the prior art.

In future telecommunications network architectures the concept of a call may be replaced by that of a session or other concept; in the Telecommunications Information Network Architecture (TINA) for example, the concept of a call is replaced by a 'session', and a query and response is replaced by a sequence of messages within the session). The invention encompasses such architectures. Similarly the concept of an originator is proposed to move to an 'invoking party' and a terminating party is proposed to move to an 'invited party'.

It is understood by those skilled in the art that differing intelligent network standards exist, including the Bellcore AIN releases as well as the ITU IN standards, and that implementations of such standards are often partial in differing geographical regions and individual network operators. Many networks only use AIN/IN for specific services, and implementations of AIN/IN in many networks are to some degree proprietary. The descriptions hereinafter borrow from both AIN and IN terminologies, however for those familiar with only one such system there are usually equivalent capabilities in the other system. Moreover, the standards for 'Signalling System No. 7' differ between regions and individual networks, with the US standard being ANSI SS7, and Europe's standard being. ITU's CCS7; implementations also vary within different networks and territories, with the current signalling standard in the UK for example being set by British Telecommunications plc with their version of the CCS7 standard TUP (Telephone User Part) being implemented in BT-NUP (defined in the BT document BTNR167). The call drop-back facility for example is not noted in the standard CCS7 TUP, but is noted in BTNR167, and is also planned for later releases of Signalling System No. 7 ISDN User part (ISUP). As the degree of CCS7 implementation in networks has not been fully rolled out, some of the information and/or call flows have to be realised in a non-ideal way (using "tromboning" where a call cannot be dropped back for example), however this does not affect the essence of the invention, and indeed as the architecture of telecommunications networks evolve, the implementation of the invention will increase in elegance. For ease of reference I use Signalling System No. 7 in this document.

STPs are typically used in intelligent network implementations where non-associated or quasi-associated signalling is used, for example in the United States. In other IN implementations, STPs may not always be employed.

In the description of any IN/AIN implementations that follow, AIN terminology such as 'a TCAP query' has been used for simplicity to describe interactions between SSPs and SCPs for example. In Europe, convention would dictate that such a phrase as 'an INAP (Intelligent Network Application Part) query' is used instead, but as INAP runs over TCAP in the Signalling System No. 7 protocol stack, the phrase 'TCAP query' has been used for commonality purposes, as this is commonly understood in the USA. Where the phrase 'raw TCAP' has been used, this indicates a non-intelligent network implementation of the message thus referred to, and this distinction should be noted.

For ease and consistency of reference, the word subscriber has been used, and again for these reasons it has been generally assumed in the text that there is only one user associated with the subscriber's subscription. It will be apparent to those skilled in the art that additional embodiments are possible when more than one user is associated with a subscription.

Similarly, the terms network operator and carrier have been used synonymously, but it should be noted that a carrier may own or control more than one network, but in the embodiments described hereinafter there is a one-to-one mapping.

FIG. 1 illustrates a conventional intelligent network to which a subscriber 1 connects via a subscriber line 1a to the network. A switch which has a service switching function in association therewith forms a service switching point (SSP) 2. The network comprises at least one such SSP 2, and a subscriber 1 making a call connects to one such SSP 2 by a subscriber line 1a. The service switching points (SSPs) 2 can act to pass communication control information or switching information to a Service Control Point (SCP) 9 optionally via a one or more Signal Transfer Points (STPs) 7. The SCP 9 processes the communication control information, and again optionally via one or more STPs 7 passes the processed control information back the SSP 2 for routing of the call. (The service management system (SMS) 6 is not used on a call-by-call basis, but is an administrative database and holds data on the services to which individual subscribers such as subscriber 1 have subscribed; this SMS 6 updates any changes to subscribers' service profiles in the SCP 4.) This conventional arrangement is used for basic 'Freephone' number calling for example. Let us assume that the 'Freephone' number is desired to terminate at subscriber A's number. The call processing may use the following steps;

The subscriber 1 dials the 'Freephone' number (eg 0800 1234567).

The SSP 2 'sees' the called party number prefix (0800) and suspends the normal processing of the call and sends a query message to the SCP 9 possibly via STP 7.

The SCP 9 uses a service logic programme and the information on the originating subscriber's service profile to translate the 0800 number into subscriber A's number.

SCP 9 then returns subscriber 10's number to the SSP 2 again possibly via STP 7, and may also instruct the SSP 2 to monitor the call for billing purposes and to pass the 'call detail record' back to the SCP 9 after the call ends.

SSP 2 then routes the call to subscriber A's number.

Figure 2:
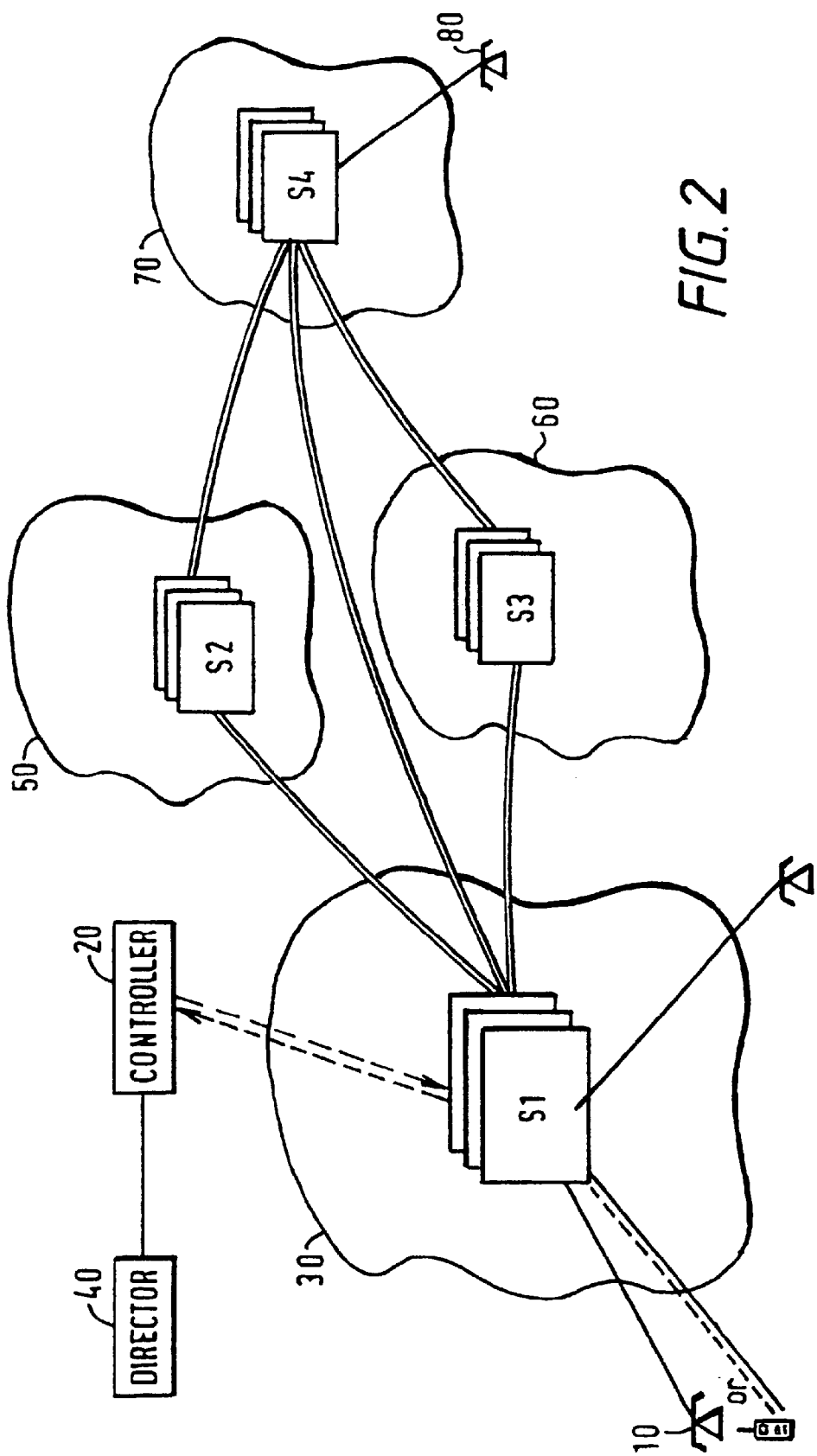
FIG. 2 is a schematic general diagram of a network controlled in accordance with an embodiment of the present invention.

FIG. 2 illustrates schematically the principles of the present invention wherein a subscriber 10 connected to an originating network 30 makes a call via at least one of a plurality of switches S1. Communication control signals in the form of one or more messages are passed from switch S1 to a controller 20 external to the originating network 30 and independent thereto. Switch S1 has been pre-programmed to pass the communication control signals in the above described manner. The controller 20 processes the communication control signals under the direction of a third party director 40, using information on costs incurred in routing communications originating at subscriber to through other carrier networks 50 and 60 (or directly) to a terminating network 70 to reach a destination 80, in order to calculate the route as a function of the information on costs, e.g., in order to calculate the route using the carrier network and/or route which incurs the least cost. Processed communications control signals are then returned to the switch S1 and the telephone call is routed via the network 50 or 60 (or directly) through terminating network 70 to the destination 80 in accordance with the processed communication control signals. As can be seen in this embodiment the controller 20 is independent to the originating network 30 and can be directed by any third party directions. The director 40 can comprise at least one of a user, a subscriber, a communication service provider, and a communications network operator. The operator of the control means 20 will typically be a service provider or communications network operator. The subscriber 10 can act as the director 40 in order to provide the required services. The director 40 can direct the operator of controller 20 manually to set up the processing for the service, or alternatively the director 40 can be provided with the ability to directly interface with or dial into the controller 20, in order to set up the processing in controller 20 to provide the required services; this in turn may alter the programming in switches S1. Alternatively, the director 40 could comprise a service provider which is to provide a service for a number of subscribers. The pre-programming of the switch S1 will include such steps as are necessary to decode routing information (i.e. codes relating to which carriers and/or routes are selected) that can be received by switch S1 as part of the processed communication control signals returning from controller 20 to switch S1.). There are a number of ways in which the schematic arrangement of FIG. 2 can be implemented and these will now be described hereinafter.

Figure 3:
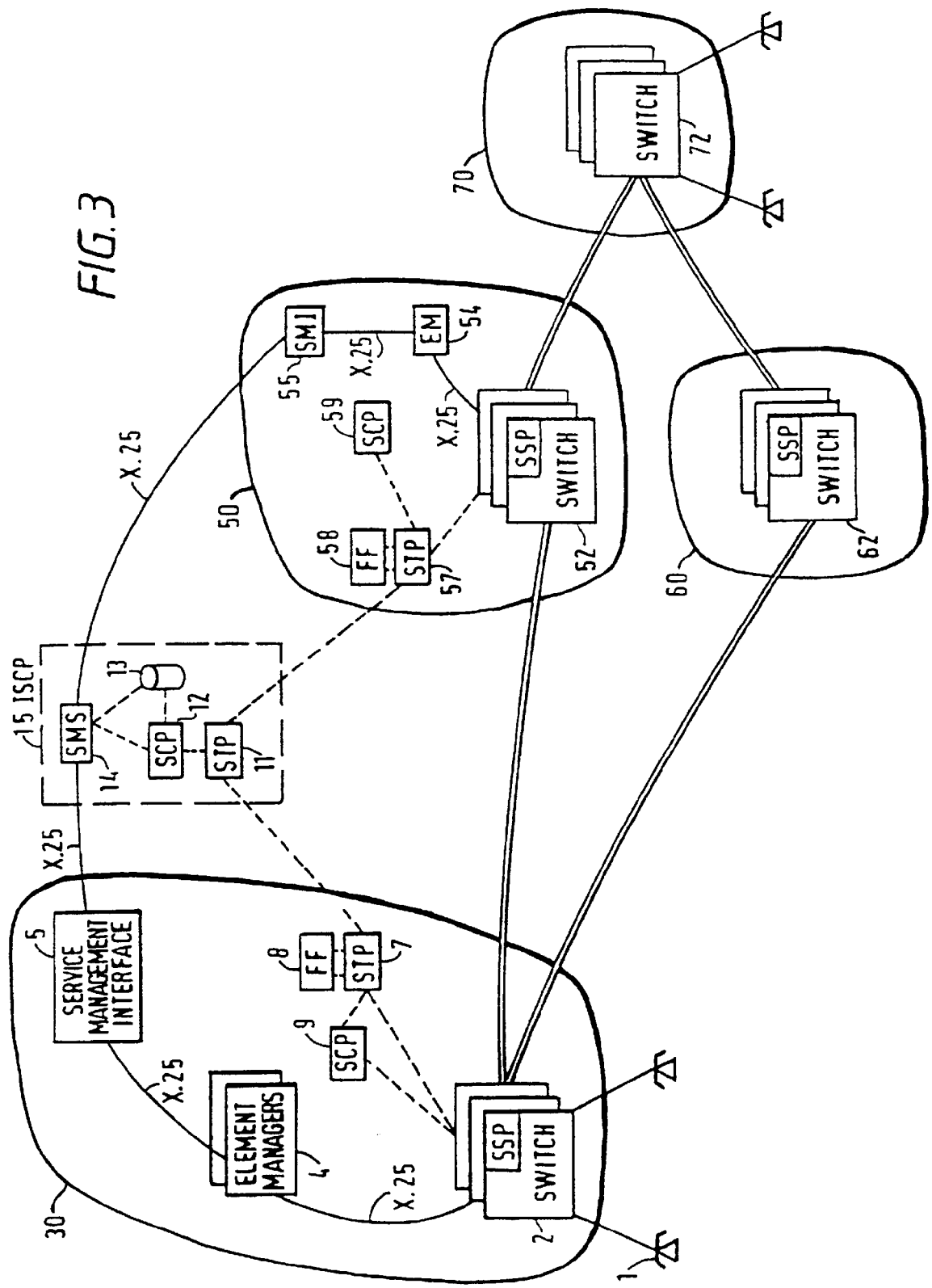
FIG. 3 is a diagram of a second embodiment of the present invention.
Figure 4:
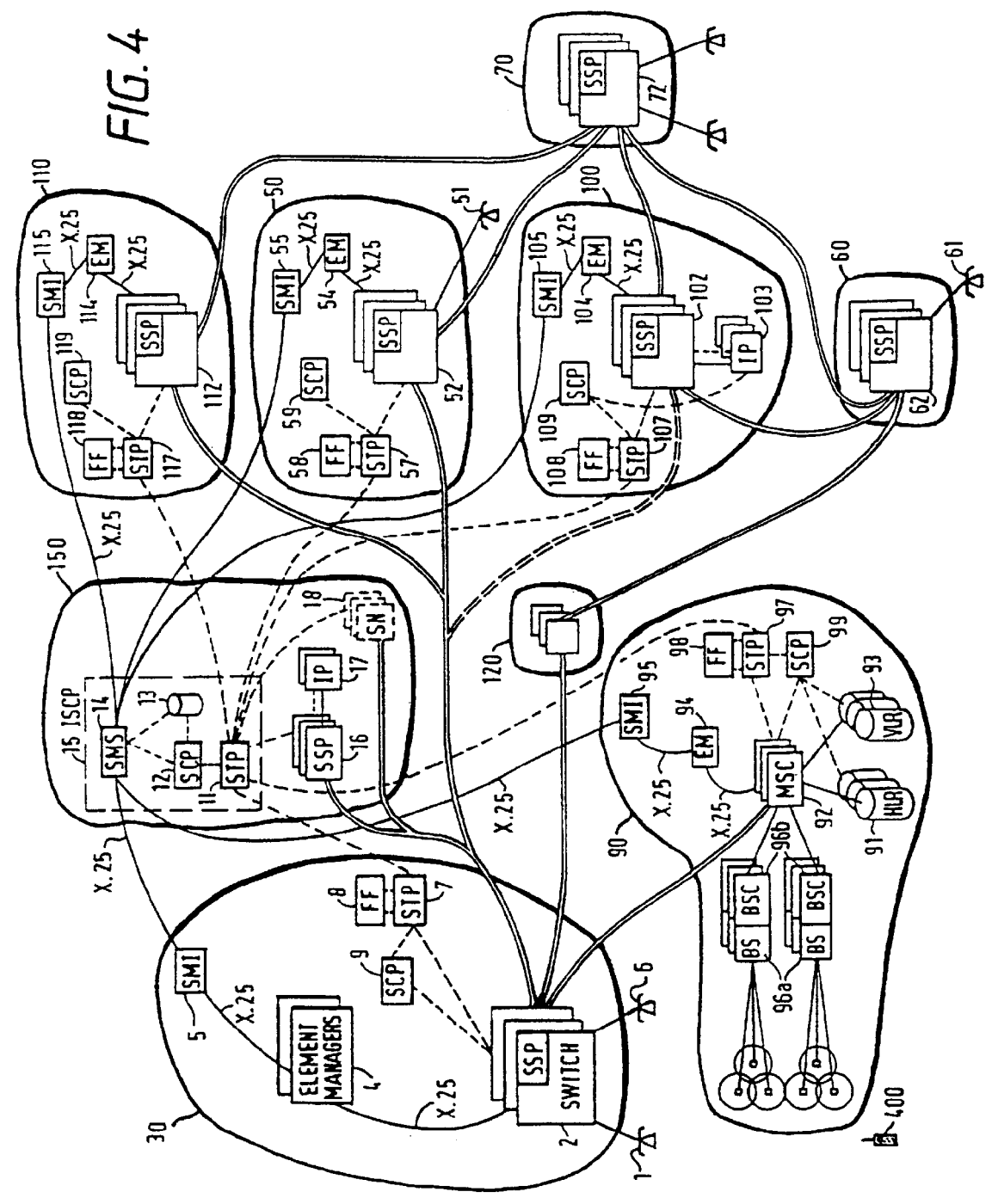

FIG. 3 illustrates an embodiment of the present invention which comprises an intelligent network (IN), which in US terminology would be described as an Advanced Intelligent Network (AIN). A subscriber 1 is connected to one of a plurality of switches 2 within communications network 30. Each switch comprises a telephone exchange with SSP functionality. Also shown are communications networks 50 and 60 each containing one or more switches 52 and 62 respectively, and a destination network 70 containing one or more switches 72. The originating network 30 connects via trunks to switches 52, 62, and 72 of carriers 50, 60 and 70 respectively. Within the network 30 there is provided network element managers 4, which are used by the operator of network 30 (hereinafter described as carrier 30), to programme switches 2. Separate to the network 30 there is provided a controller embodied as an Integrated Services Control Point (ISCP) 15 in which an SCP 12 is connected to the SSP of the switches 2 via an STP 7 and a 'fire wall' or 'filter' (FF) 8. The firewall or filter (FF) 8 may be embodied as a special purpose SCP within carrier 30's network; alternatively some of the FF functions may be resident as additional software within the SCP 9 that carrier 30 may normally use for its own IN call processing and/or in the STP 7. SCP 9 is connected to the SSPs in switches 2 and to STP 7. The connections shown as dotted lines that link to switch 2, STP 7, FF 8, SCP 9 and ISCP 15 are Signalling System No. 7 data links. The function of the FF 8 is to validate/authenticate and generally approve message type, content, sequence, and addressing, so that the signals directed from ISCP 15 to switch 2 are checked for authenticity, validity, or compatibility with the carrier 30's network implementation, regulatory constraints, and valid address codes for elements within (and possibly outside) carrier 30's network. The firewall/filter functions inside the ISCP controller 15 (functions used for similar validation and/or authentication of signals from networks 30 or 50) are in this example embodied variously in the STP 11 and the SCP 12, although separate embodiments of these functions are possible. Similar FFs 58, 98, 108, 118 are provided in networks 50, 90, 100, 110 as can be seen in FIG. 4. The SCP 12 if provided with a database 13, shown separately and as part of the ISCP here, although in some embodiments, the database 13 may be integrated into the SCP 12, and in other embodiments one or more such databases could be used; such databases may be external to but connected with the ISCP, and some may even be operated or directed by a different third party. The SCP 12 is also provided with directions from a director (not shown, and which can comprise at least one of a user, a subscriber, a service provider, and a communications network operator), are entered into the service management system (SMS) 14. The service management system (SMS) 14 is connected over an X.25 link to a service management interface (SMI) 5 within the originating network 30, and this service management interface (SMI) 5 is in turn connected over an X.25 link to network element managers (EM) 4. The element managers 4 are connected over X.25 links to the switches 2 in order to update the programmes and trigger points therein. Where X.25 links have been shown, it is also possible for other types of data links to be used depending on the network architectures within network 30 and the network (not shown) associated with the ISCP 15. (The information used to update the programmes and trigger points in the switches is sometimes described in IN terminology as 'service trigger information'.) In this way the service management system (SMS) 14 can control the programming of the switch 2 in order that call-by-call queries can be sent via the STP 7 to the ISCP 15 in order for example for a least cost routing determination to be carried out. Although in this embodiment the programming of the switches 2 is achieved via the SMI 5 and the element managers 4, it will be apparent to those skilled in the art that such programming is also possible by means of the SSP switch 2 and the SCP 12 establishing a TCAP dialogue via the STP 7 and FF 8, and service trigger information being downloaded into SSP switch 2 (again via STP7 and FF 8). Instructions for service provisioning and/or service changes (that reach the ISCP 15 either manually by the operator of ISCP 15 or for example by the subscriber dialling in to the ISCP 15), can if required alter the programming in switches 2 using either of the alternative means outlined above. The SCP 12 and/or the database 13 can contain information on tariffs for the other carriers 50 and 60 (and 30) in the composite communications network to enable a determination as to which network carrier 50 or 60 (or 30) the call is to be routed through in order to achieve for example the lowest cost, and as to which alternative network carriers should be used if the first carrier's network is busy. The pre-programming of the switches 2 may cause or trigger communication control signals to reach ISCP 15 for all outgoing calls from the subscriber, and/or for all incoming call attempts to the subscriber, and/or for specifically identified communications criteria using a combination of AIN triggers. The pre-programming of the switches 2 will also include such steps as are necessary to decode routing information (i.e. information relating to which carrier is selected) that can be received by switch 2 as part of the processed communication control signals returning from ISCP 15 to switch 2. Switch 2 then acts in accordance with the processed communication control signals to effect the desired call processing or routing. (The information on alternative carriers and/or routes to be used in case of congestion in the network of the first selected carrier may be returned as part of the first processed communications control signal, or as part of subsequent communication control signals.) As can be seen in FIG. 3, the carrier network 50 is also connected via STP 57 to the ISCP 15 by means of a Signalling System No. 7 data link, allowing calls received at switch 52 to also be processed (to achieve least cost routing for subscribers such as subscriber 51 with exchange lines connected to carrier 50's network, or for example and to be described in detail subsequently, to achieve 'end-to-end routing control'). In this embodiment the switching point 52 is also a telephone exchange with software loaded to provide an SSP. The pre-defined triggers for the queries to be sent from the SSP 2 to the SCP 12 in ISCP 15 are at least one AIN trigger (using US AIN terminology). Examples of AIN triggers are off-hook immediate, off-hook delay primary rate interface, individualised dialling plan, office dialling plan, transit network selection, originating line information, directory number, automatic route selection, automatic alternate routing, basic rate interface feature button, terminating attempt and virtual number. (For countries with ITU standards, the trigger point is a combination of either an IN trigger detection point (TDP) or an IN event detection point (EDP), and trigger criteria indicating what conditions must be met e.g. called number, calling number, line busy etc.) The messages passing between the SSPs (2 52) and the SCPs (9 12 59) are Signalling System No. 7 messages which may be sent over one or more Common Channel Interoffice Signalling (CCIS) networks, and which may be sent via one or more Signal Transfer Points (STPs) (7 11 57). Normally the service logic in the SCP 12 is invoked on the first query message from SSP 2, however the service logic may need to invoke further 'nested' queries to carry out more complex communications processing.

The typical means of operation of such a system for an outgoing call is as follows:—

The subscriber 1 directs the operator of ISCP 15 to set up a least-cost outgoing calling service. The operator of ISCP 15 enters the relevant information into the SMS 14, which then updates carrier 30's SMI 5, which in turn via an element manager (EM) 9 pre-programmes the switch 2 to which subscriber 1's exchange line is connected. SMS 14 also updates SCP 12 or database 13, and the least-cost routing service is now active. Upon an outgoing call from subscriber 1's exchange line with the pre-requisite number of digits having been dialled, the AIN triggers in switch 2 are activated and a TCAP query message is sent from switch 2 via STP 7 to ISCP 15. ISCP 15 validates and authenticates the message in its STP 11 and SCP 12. Processing of the query message is carried out in SCP 12 to determine the lowest cost carrier and route, optionally using data in database 13, and a TCAP response message containing routing instructions for switch 2 is generated within SCP 12. This response message is then sent via STPs 11 and 7 to switch 2, which then receives the response message, decodes it, and executes the routing instruction contained in the response message. The call is thus routed according to the lowest cost carrier and route.

The typical means of operation of such a system for an incoming call requiring redirection is as follows:—

The subscriber 1 directs the operator of ISCP 15 to set up a least-cost incoming call redirection service. The operator of ISCP enters the relevant information into the SMS 14, which then updates carrier 30's SMI 5, which (as before) via an element manager 4 pre-programmes the switch 2 to which subscriber 1's exchange line is connected. SMS 14 again updates SCP 12 and/or database 13, and the service is now active. (The mechanisms whereby subscriber 1 alters programming parameters such as redirection numbers are described in detail with reference to FIG. 7, but will usually be based on Customer Local Access Signalling System (CLASS) services already in common use for such purposes.) Upon an incoming call attempt reaching switch 2 from say subscriber 51, and assuming subscriber 1 wishes to redirect their incoming calls to destination 61, the triggers in switch 2 are activated and a TCAP query message is sent from switch 2 via STP 7 to ISCP 15. As before, ISCP 15 validates and authenticates the message in its STP 11 and SCP 12, and SCP 12 processes the query but using the telephone number of destination 61 (previously entered e.g. via CLASS services), to derive a least-cost carrier and/or route selection, and generating a TCAP response message containing routing instructions in accordance with the carrier and/or route selected. The TCAP response message is again sent via STPs 11 and 7 and FF 8 to switch 2, which then receives the response message, decodes it, and executes the routing instruction contained in the response message. The call is again thus routed according to the lowest cost carrier and/or route from switch 2 to the destination 61. By the methods outlined above, the third party directing the processing within the ISCP 15 can effectively take control of outgoing and incoming calls on behalf of a subscriber.

FIG. 4 illustrates in detail an intelligent network embodiment of the present invention in which there are a plurality of interconnected carrier networks 30, 50, 60, 70, 90, 100, 110 and 150, forming a composite communications network. FIG. 4 can be viewed as an extension of FIG. 3; the same numbering has been used, and the description of FIG. 3 above applies equally to FIG. 4. What follows is a description of additional features and functionality in reference to this figure, together with some more complex examples of use.

A carrier can be any entity operating a communication network and a service provider is the entity providing a communication service over its own communications network and/or other communications networks. The carriers could alternatively be mobile networks or privately owned corporate networks or national/international virtual private networks (NVPNs and IVPNs), or could themselves be composite networks. The subscriber 1 (that also owns mobile handset 400) to whom the enhanced service is being provided will have a subscriber service profile pre-programmed into the switch 2 of the network operated by the subscriber's local exchange carrier 30 and/or another similar subscriber service profile programmed into network elements within mobile carrier 90, which, upon activation of a predefined trigger, sends a signalling message to the master service provider defined in the 'subscriber service profile' (in the example shown in FIG. 4 this master service provider is the operator of carrier network 150, and the control means within this network is the ISCP 15). Upon receipt of a query signal from any SSP in the network, ISCP 15 then returns normally just one signalling response message (however the query/response sequence may be repeated a number of times to effectively form a dialogue or the query/response sequence may be interspersed with one or more pairs of 'conversation' messages in a TCAP dialogue), which gives or call processing instructions to the originating network 30 or 90. The originating network 30 or 90 may again at its option authenticate and validate the call processing instruction with a 'firewall' or 'filter' (FF) 8, 98 (to ensure compatibility with the network elements handling the call). In the composite network embodiment illustrated in FIG. 4 the composite network comprises eight separate carriers and/or service providers one of which acts as the master service provider (ie controller 20 in the FIG. 2 schematic) and these are:

a. A local exchange network (originating network) 30 that subscriber 1 is normally connected to;
b. A destination carrier 70;
c. The master service provider 150;
d. Two separate carrier/service providers 50, 110 offering services;
e. An interconnecting carrier 120;
f. The carrier 60 which has a subscriber 61 connected to it, and which is connected to originating network 30 only via carrier 120;
g. A carrier 100 that is directly connected to carrier 60 and may or may not be directly connected to the subscriber's carrier but which has connected to it an IP 103; and
h. A mobile carrier 90 that the subscriber is normally connected to in their 'home' region (another originating network).

In FIG. 4 the originating carrier 30 includes a number of local exchanges or switches 2 providing connections to and from local communication lines coupled to end users' telephone equipment of subscribers 1 and 6. The other originating network, mobile carrier 90, includes the number of mobile switching centres (MSCs) 92 providing connections to the radio network offering the service to the subscriber's mobile handset 400). Each fixed network carrier will also typically have one or more tandem switching exchanges providing trunk connections between the local exchanges and between themselves, and some networks may have intermediate switching exchanges between local exchanges and tandem exchanges in the switching 'hierarchy'. Some large network operators may have many hundreds of switches, others may have only one switch. These distinctions are readily apparent to those skilled in the art. The local, tandem, and intermediate switches in each carrier are therefore not shown separately, but for ease of illustration are shown as a 'stack' of switches with one number against the stack, and a reference in the text to 'switch 2', for example, may refer to any one or a plurality of switches 2 unless further specified within the text. The originating carrier switch 2 connects via trunks to switches 52, 62, 92, 102 and 112 in the networks of carriers 50, 60, 90, 100, 110 respectively (although the direct connection of switches 2 and 102 is not necessary—and these trunks are therefore illustrated with a heavy dashed line). For ease of illustration, trunks have not been drawn between carrier 90 and the other carriers (60 70 100 110 120 130), nor between carriers 30 and 70. The direct termination option between either of carriers 30 or 90, and terminating carrier 70 should however be noted, as should the possibility that a call originating on carrier 30 transits via another network (say carrier 10) and then returns to carrier 30 for termination to a termination point 100 on carrier 30's network—such routing may be desirable for reasons of cost. Each of the switches has at least minimal signalling capability and typically consists of programmable digital switches with CCIS (Common Channel Interoffice Signalling) communications capabilities; they are referred to as Signalling Points (SP) in relation to intelligent network practice. One example of this is the Nortel DMS range of switches. Other vendors such as GPT Lucent and Ericsson manufacture comparable switches that similarly can have additional software loaded to effectively turn the SP implementation into a SSP implementation which can recognise the full set of AIN/IN triggers and launch appropriate signalling messages. It should be noted however that not all of the composite network switches need this functionality. In the originating network 30 at least the local exchange switch 2 (or a switch 2 through which all of subscriber 1's calls pass), and preferably all the switches are programmable to be able recognise trigger points (predefined triggers) and to be able therefore, on activation of a trigger by the trigger conditions being met, to send messages to and receive messages from the ISCP 15 operated by carrier 150. In the other originating network 90 the MSCs 92 should be so programmable. Carrier 150's switch 16 should also have SSP functionality, as should at least one of each of switches 52, 102 and 112. The initial selection of which carrier operates as this 'master service provider' is controlled by the programming entered into or down-loaded into switches 2, 92 and/or into other network elements (such as Home Location Registers (HLRS) in the case of mobile network 90). (For the purposes of this FIG. 4 the carrier that has been selected to operate as this master service provider is carrier 150.) Switches such as switch 2 that have the capabilities to send and receive AIN triggers are referred to as Service Switching Points (SSPs). The master service provider 150's ISCP 15 comprises an STP 11, an SCP 12 a database 13 and a service management system 14. The ISCP 15 may in other embodiments be replaced by its constituent parts. The database 13 contains information to be used by the SCP 12 for processing the control signals. The service management system comprising separate administrative database 14 contains the subscriber service profile data used to update the SCP 12 and/or database 13, and to interface with other carrier's administrative systems, embodied by SMIs 5, 55, 95, 105, and 115 in carriers 30, 50, 90, 100, and 110.

The ISCP 15 operates to:

a. Down-load subscriber-related programming, parameter, and option selection information processed by the SCP 12 for the purposes of setting up or modifying the programming, parameters, or options in the network elements to which to down-loading is directed, so that the subscriber's service is set up or modified according to their requirements. In network 30, this information would be downloaded into at least one switch 2 of the subscriber's network 30 via STP 7 and FF 8, or via the network element managers 4 and service management interface 5 which is typically linked to the switches 2 via an X.25 link. (In other networks the corresponding network elements would be downloaded to.)

b. Receive and return signalling messages from and to the switch 2 of the originating network;

c. Send signalling messages to and receive signalling messages from SCPs 59, 99, 109 and 119 and/or SSPs 52, 92, 102 and 112 via STPs 57, 97, 107 and 117, and/or to and from like means operated by other carriers or service providers, and/or to and from the Intelligent Peripheral (IP) 17 or service node (SN) 18 of the carrier/service provider 150.

The constituent components of the ISCP 15 are typically connected by an internal and separate high speed data network. Within the local exchange network 30 the common channel inter office signalling (CCIS) network may include one or more STPs and includes Signalling System No. 7 data links shown as dotted lines between SSPs 2, SCP 9 (and STPs 7 and FF 8). Typically STPs are implemented as mated pairs for redundancy purposes, so references to 'an STP' in this document can generally be read as 'an STP pair'. A Signalling System No. 7 data link also connects STP 7 to STP 11. Other dotted lines shown in this and other figures are also Signalling System No. 7 links. The purpose of the intelligent peripheral IP 17 is to provide intelligent announcement and digit collection capabilities and possibly speech recognition. The intelligent peripheral 17 is connected via an appropriate circuit to a switch 16 of the carrier/master service provider 150's network. The IP 17 communicates with the ISCP 15 or the STP 11 via a data communications network. (An emerging alternative IN implementation is the Service Node (SN) 18 where the SN embodies a Specialised Resource Function, a Service Switching Function, a Service Control Function, and a Service Data Function. A service node could thus replace the SSP 16, the IP 17, and all the constituent parts of ISCP 15 except the Service Management System. Not all of the functions within the SN may be used however, and in this figure the SN 18 has been illustrated as a replacement for SSP 16 and IP 17, and links to the ISCP 15 via a separate data communications network, but if this arrangement were implemented in practice, the service node's internal SSP being tightly coupled to the internal SCP would necessitate this internal SCP being programmed to transfer messages to and receive messages from SCP 12.) Although in this diagram the terminals at 1, 400 are shown as telephones, they could in fact be any device compatible with a local communications line or mobile communications link. Where the line is a standard voice grade telephone line, the terminals could include modems, PBXs, or facsimile machines. Where other types of links are used e.g. broadband lines, radio, etc, then other terminal devices may be used. FIG. 4 illustrates carrier network 90 as a GSM mobile network. In this network mobile subscribers 400 communicate with Base Stations (BS) 96*a* which have respective Base Station Controllers (BSC) 96*b* associated therewith. Base station controllers 96*b* communicate with a Mobile Switching Centre (MSC) 92. A Home Location Register (HLR) 91 is provided which comprises a database used to store the subscriber information for all subscribers within the home service area of the service provider. The visitor location register (VLR) 93 is provided to store information about visiting subscribers who are not in their home service area. The mobile network is connected to carrier network 30 via the MSCs 92. Also for switching purposes MSC 92 is connected over an Signalling System No. 7 link via an STP 97 to the SCP 16, and HLRs 91 and VLRs 92 are also linked to STP 97 via Signalling System No. 7 data links. The control of the signal addressing (to ensure that communication control signals are received by the ISCP 15) can be achieved by loading the necessary information into the HLR 91, from which it can be subsequently loaded as part of the normal operations of a mobile carrier with other information contained in the HLR 91, into the MSC 92/VLR 93 of the physical location where the mobile user is based and where the call may originate from. (MSCs and VLRs are frequently implemented in mobile networks as combined MSC/VLR pairs.) Some alteration may be necessary of the data structures within the HLR and MSC/VLR combinations, but in general MSCs can be relatively simply upgraded with software from the MSC manufacturer to provide the MSC with SSP functionality. Similar structures of network element managers 94 (and in some cases a service management interface 95) exist that can be linked to carrier 150's subscriber management system 14.

Referring now to the method of operation, assuming the use of an off hook delay trigger, for a subscriber that has subscribed for example to a 'least cost outgoing call routing service' from master service providing carrier 130; every time a terminating station goes off hook and has dialled the pre-requisite number/selection of digits, the switch 2 sends a TCAP signalling query message via STP 7 to the master ISP 150 's ISCP 15 (and specifically SCP 12 via STP 11). The database within the ISCP 15 (at SCP 12 and/or database 13) identifies the carrier and/or route which can provide the least cost termination for that call e.g. carrier 50, and sends back to switch 2 via STP 7 and FF 8, a TCAP signalling response message, containing a routing instruction to the switch 2 to route the call via carrier 50, and containing billing instructions to the switch 2, such that carrier 50 charges that call to carrier 150's account with carrier 50 (so carrier 150 can arrange for the billing of subscriber 1). (Alternate routing instructions may accompany or follow if the specified route is congested.) These billing instructions to switch 2 during the call set-up phase switch may also request billing information from switch 2 to be sent to ISCP 15 as part of the call tear-down process; (and these instructions could invoke a further instruction to switch 2 to request billing information from carrier 50's interconnecting switch and having both billing items sent back to ISCP 15 so real-time accounting could be accomplished). Current agreed inter-administration procedures do not cater for this real-time billing, however technical implementation is possible, and particularly with end-end routing scenarios, such a facility would be allow the communications cost data stored in SCP 12 or in database 13 to be validated and speedily adjusted. The billing information may have been requested as described above, at the time of call tear-down, or may be stored in the various switches (in this case 2, 52) and forwarded to ISCP from carriers 2 and 52 as part of normal inter-administration procedures. As before, STPs may not be used to route signalling messages except where non-associated or quasi-associated signalling is used e.g. in the USA. If the call is a local call, then it is likely that the signalling message will result in an instruction that the call will be completed by the subscriber's local network 30, but the billing could again be organised via carrier 150 so that the billing for this call can, if desired, be consolidated with the billing of the previous call example.

In another example, when subscriber 6 dials subscriber 1 and subscriber 1 has actuated a service with carrier 150 to divert all incoming calls to carrier 150's voice mail, except priority calls where the caller enters a previously known and preprogrammed priority PIN number and consequently gets routed to subscriber 1's mobile handset 400. As before, switch 2 detects the termination attempt trigger and in response the switch 2 formulates a TCAP protocol query message and sends that message through the Signalling System No. 7 network including one or more STPs 7 to the ISCP 15. The ISCP 15 uses the dialled digits (i.e. called party address) to return a response back to switch 2 via the STP 7 to route the call through SSP switch 2 via one or more tandem exchanges into switch 16 and then to the correct routing number in IP 17. The IP 17 will record a message from the subscriber 6, unless subscriber 6 overrides the announcement by dialling the PIN number on their handset. In this case the IP 17 sends a signal back to the ISCP 15, and where possible in the carrier networks and interconnect signalling, the ISCP 15 then instructs the dropping back of the call to switch 2 with a routing instruction to route the call to the subscriber's mobile number (at handset 400) on carrier 90's network. Switch 2 re-routes the call, and subscriber 1 answers. A more complex example is where subscriber 1 has defined a service with carrier 150 for all incoming calls to be diverted to a voice mail system operated by carrier 60 wherein the originating subscriber is subscriber 61. In this case subscriber 61 dials subscriber 1 through switches 62 and 2, and via interconnecting carrier 120's network. As before switch 2 detects the termination attempt as a trigger. In response, the SSP switch 2 formulates a TCAP protocol query message and sends that message through the Signalling System No. 7 network to the ISCP 15. The ISCP 15 uses the dialled digits (ie the called party address) to return the relevant number within the voice mail system operated by carrier 100 using IP 103 and sends an instruction to switch 2 to route the call directly from switch 2 to switch 102 without 'tromboning' the call, but instead by dropping back the call through interconnecting carrier 120 to one of switches 62, and onward from that switch 62 to switch 102, which would then route the call to IP 102, thus utilising the most efficient call path. If IP 102 was connected to the Signalling System No. 7 network at switch 102 and switch 102 was connected to the STP 11 via the composite Signalling System No. 7 network, the ISCP could take control of the call again if for example certain PIN digits were entered by the originating subscriber 61 and then further call processing instructions could be given by the ISCP 15 through the composite SS7 network.

Another set of examples can be provided if, as illustrated, ISCP 15 is connected to other carriers SCPs (59 109 119) optionally via STPs (57 107 117); ISCP 15 then has the capability, if so programmed, to construct composite services consisting of individual services from those carriers (50 100 110) as well as its own services prioritised in a hierarchical fashion and/or selected based on combinations of the individual trigger criteria and status information such as time of day (as per the prior art); interworking of IN service control functions is addressed in the ITU's IN CS-2 recommendations.

In the embodiments shown thus far, for ease of illustration, it could be assumed that the particular switch sending the query to the controller is the subscriber's local exchange. This may not necessarily be the case, and in some network implementations; the switches that are triggered and that therefore send the queries, may be intermediate or even tandem exchanges. It should also be noted, in addition to the above, that although query and response messages may be sent from and returned to one switch in the communications path, that re-routing will take place from another switch in the communications path. If the subscriber 1 has a special access terminal (not shown), for example a modem and PC with special software (or a 'smartphone'), they can dial into carrier 150's SMS (14) over the Public Switched Telephone Network (PSTN) and identified by their calling line identity (CLI); upon further user identification by means of a PIN number, (where that PIN may be transmitted to the ISCP via a secure encrypted link), then subscriber 1 can create or customise their own service profile within SMS 14.

In the embodiments shown in FIG. 3 and FIG. 4 which are implemented as full intelligent networks, IN Application Part is used in conjunction with the TCAP messages, so the TCAP queries and responses referred to in the text are in fact using INAP or the AIN equivalent sometimes referred to as AINAP as the protocol layer above TCAP—the distinction must be noted between this type of message and the 'raw' TCAP message, both of which would be termed Signalling System No. 7 messages. Where a raw TCAP message has been used, this is specifically.

Referring again to FIG. 4, it has been seen that the embodiments as described thus far have shown ISCP 15 sending back a TCAP signal to SSP switch 2 in response to a query therefrom, including information in the response which directs SSP switch 2 to perform routing as a function of costs of carriers directly interconnected with the originating carrier network. In alternative embodiments which can also be implemented using intelligent network architectures, control of routing is achieved for all carriers in the routing 'chain', thus opening up the possibility of achieving end-to-end routing constructed from element-based charging. This has the potential for further cost reduction. Both types of embodiment rely on additional information on communications costs being loaded into SCP 12 and/or database 13, this additional information concerning transit costs of all possible networks that could be used for the call in sequence/combination (for example in a 'tree' format with branches representing the possible carriers in the route). The first such embodiment has additional preprogramming loaded into the gateway SSP switching means 52, 102 or 112 within carriers 50, 100 and 110, such that a communication passing through that switch with certain signalling information associated therewith (hereinafter called an end-to-end routing indicator) triggers a subsequent query from that switch 52, 102 or 112, which is directed via STPs 57, 107, or 117 to ISCP 15. ISCP 15 processes the subsequent query based on information on communications costs from carriers 50, 100, or 10 to destination carrier 70 either directly or via one other of the abovementioned carriers. A subsequent routing determination is made at ISCP 15, and a return signal generated, with a subsequent routing instruction and if appropriate an end-to-end routing indicator, and the switch 52, 102 or 110 being so instructed routes the call in accordance with those instructions. If, for example, the first query from SSP switch 2 receives a return response which includes the end-to-end routing indicator, directing the use of carrier 110 and with instructions to switch 2 to relay the end-to-end routing indicator to carrier 110, then upon the call (and the end-to-end routing indicator reaching carrier 110's SSP switch 112, a second query is launched again directed at ISCP 15, either directly (ie via STP 117) or via SSP switch 2 and STP 7. A second response is generated at ISCP 15 (again based on the 'tree' of routing costs) again including the end-to-end routing indicator, directing the use of carrier 50 and with instructions to switch 112 to relay the end-to-end routing indicator to SSP switch 52; this second response is routed back to SSP switch 112 in carrier 110's network, again either directly (ie via STP 117 and FF 118) or indirectly (via STP 7, FF 8, and SSP switch 2). Upon receipt of this routing instruction, SSP switch 112 routes the call to switch 52 in carrier 50's network. The next query in the sequence will be triggered at carrier 50's switch 52, and be routed to the ISCP 15 directly, (ie via STP 57), or indirectly back along the signal path (via switch 112, switch 2, and STP 7); this query in turn then receives a response. By this means, ISCP 15 retains control of the call as it progresses. It will be apparent to those skilled in the art that this process could be repeated through a multiplicity of carriers until the call is terminated at the destination carrier (in this example carrier 70), and that there is a signalling overhead associated with this method, which should therefore be taken into account in the cost calculations, and also that some modification of current interconnecting signalling procedures and protocols may be needed to accommodate an end-to-end routing indicator unless such an indicator is inserted into an existing signalling information field.

A modification of this first embodiment involves the ISCP 15 downloading sections of the routing tree related to a particular carrier (50 or 100 or 110) to the SCPs (59 109 and 119) in the respective carrier together with a subset of the service logic from ISCP 15, and the abovementioned second or subsequent queries and responses are directed to and received back from the respective SCPs. The second embodiment of this end-to-end routing is simpler in concept but will almost certainly require some modification of current interconnecting procedures and protocols. A query from SSP switch 2 is directed to ISCP 15 via STP 7, and ISCP 15 then generates a response and passes it to switch 2 via STP 7 and FF 8, however in this response all of the information for the complete end-to-end route is included, such information being included in the signalling message that needs to exist for call set-up purposes; such information is decoded at designated switching points in the route (usually each carrier's incoming gateway switch as well as the originating switch 2) and such information may be modified by that switching point such that the original or modified end-to-end route information (stripping off for example the information relating to the part of the route that has already been traversed) is included in the signalling message that needs to exist for call set-up purposes on to the next designated point in the route and thence on to the destination. By this means, end-to-end routing information is passed along from Switch 2 to switch 112, modified at switch 112, passed with the call set-up signal to switch 52, modified at switch 52, and the process of passing on and modification can be repeated again and again until the destination is reached. This method has the advantage of passing the end-to-end routing information to the destination as part of the call, ie the call becomes self-routing.

Figure 5:
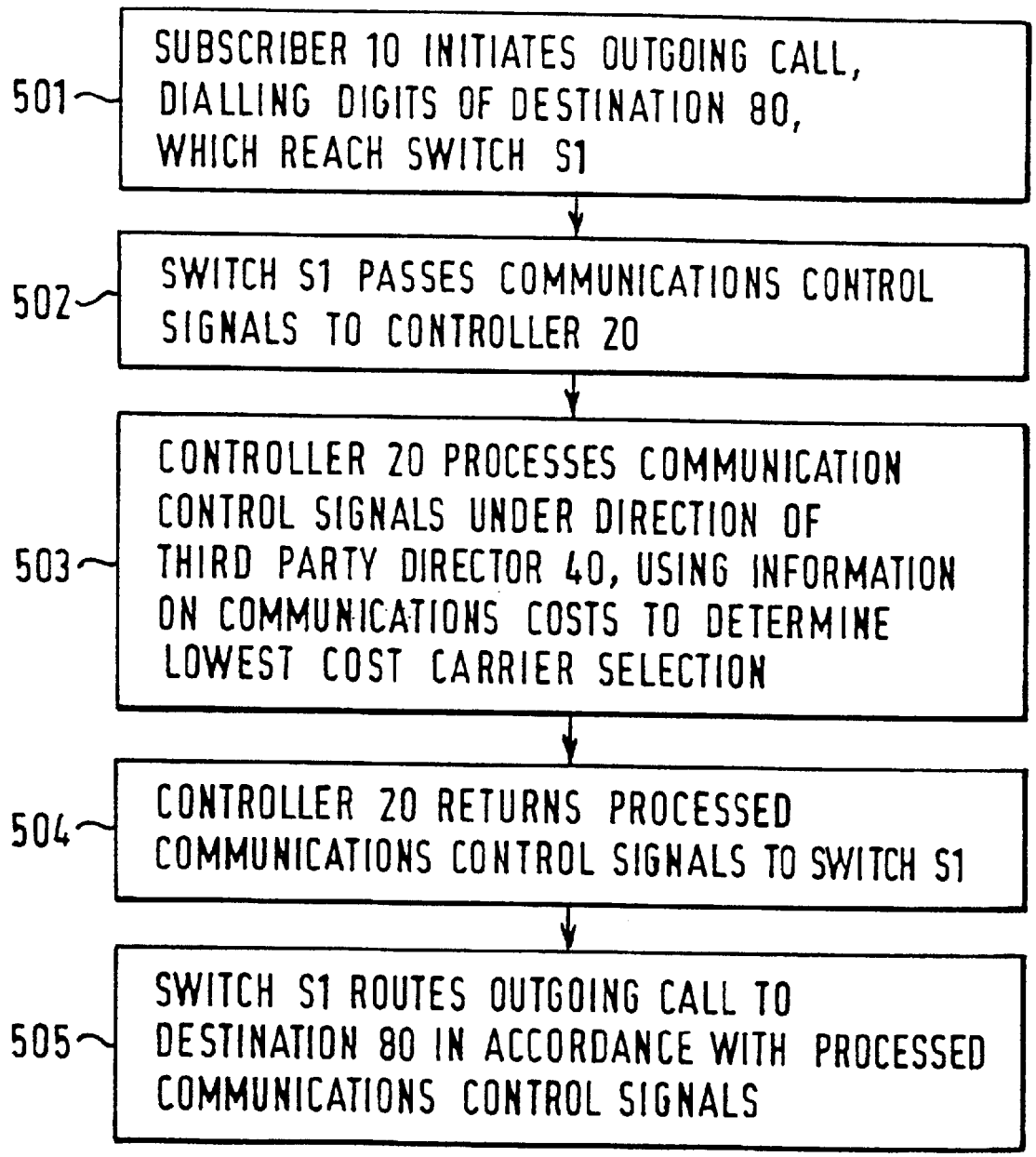
FIG. 5 is a flow chart illustrating a process associated with the present invention.

FIG. 5 is a flowchart describing a logical sequence of steps involved in the routing of an outgoing communication, using a system such as that illustrated in FIG. 2. The process starts with step 501, with subscriber 10 initiating an outgoing call and dialling the destination digits of destination 80, which reach switch S1. In step 502, switch S1 passes communications control signals to controller 20. In step 503, the controller 20 under the direction of a third party 40 processes the communication signals, using information on costs incurred in routing communications originating at subscriber 10 through other carrier networks 50, 60 (or directly) to calculate and select the route which incurs the least cost. In step 504, the processed communications control signals are returned to switch S1, and in step 505 the call is routed by switch S1 in accordance with the processed communications control signals to the destination 80.

Although the intelligent network embodiments described with reference to FIG. 3 and FIG. 4 refer to programming SSP switch 2 to pass (upon activation of an AIN/IN trigger) only communication control signals (via the Signalling System No. 7 link to the control point), in an alternative embodiment, shown in FIG. 6 and using the same description as that for FIG. 2, but where the link between switch S1 and controller 20 shown in FIG. 2 is embodied in FIG. 6 as the combination of a signalling link 21 and communications trunks 22. Switch S1 is pre-programmed to route all or a subset of subscriber 1's actual communications themselves to a control point 20; the control point can then be embodied as a telephone exchange such as the Nortel DMS range or the Ericsson AXE range for example. The trunks 22 may be necessary, as in current signalling practice a communications channel is reserved at control point 20 as part of the call set-up phase. Upon receipt of a call attempt from or to subscriber 10, switch S1 attempts to set up a call to control point 20, and reserves a communication channel from communications trunks 22 for the call it is attempting to set up to the control point 20. Control point 20 then, however, drops the call back or deflects the call back to switch S1 together with the onward routing instructions that would be recognised by switch S1 as part of its pre-programming, and as part of this process the reserved communications channel would be released. Switch S1 then onward routes the call according to the processed control signals returned by control point 20. This embodiment is less network-efficient as it involves the reserving of at least one channel that will not be used in the call route, but has the advantage of being able to be implemented without the installation of full IN facilities. Where Signalling System No. 7 is used as the signalling protocol, the call drop-back function as outlined in some standards or implementations of Signalling System No. 7 may be used, and where ISDN signalling is used, the ISDN call deflection supplementary function may be used.

Figure 6:
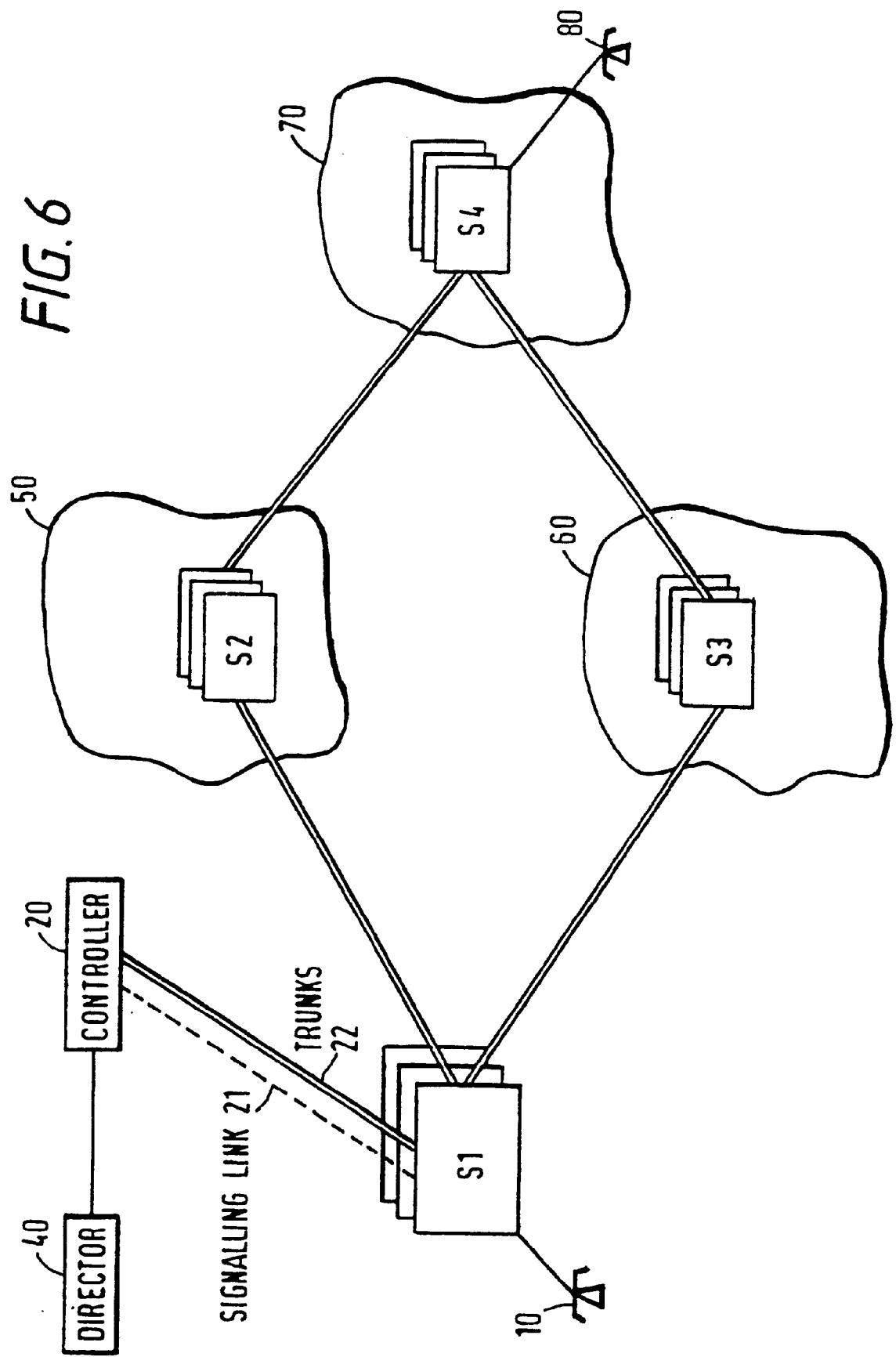
FIG. 6 is a second schematic general diagram of a network controlled in accordance with an embodiment of the present invention.

In an alternative embodiment that can also be illustrated with FIG. 6, the physical embodiment is identical, with the exception that the trunks 22 between switch S1 and the controller 20 are not used or required, and where S1 has additional software loaded to recognise triggers and launch appropriate signalling messages. Although in this embodiment switch S1 will have the same type of capabilities as a Service Switching Point, as will be outlined below, the full AIN/IN operations and information flows will not be used.

The call signal routing processor could again be a PBX or telephone exchange such as the Nortel DMS range or the Ericsson AXE range. In this embodiment, the communication control signals will use a signalling system such as Signalling System No. 7 or ISDN, or a combination of such signalling systems with appropriate translation mechanisms at either or both ends of signalling link 21 or at some point in the signalling path (not shown) of signalling link 21. Referring to the method of operation; it is possible with some signalling implementations for switch S1 to be programmed upon activation of a trigger to send a raw TCAP query message carried over SCCP (Signalling Connection Control Part), instead of using as in IN implementations the IN Application Part (INAP) that sits above TCAP in the Signalling System No. 7 protocol stack. Such a signalling message will still invoke an action at the controller 20 such as the activation of a stored programme that calculates the lowest cost carrier/route (such switches as mentioned above have the capability to do these calculations), and the controller will as part of the stored programme, send a message in return, but neither message will use specifically IN-related operations/information flows. A stored programme in switch S1 will be activated to re-route the call, the routing information having been supplied in the return message from the controller 20, and the call will be rerouted accordingly. By these means, standard telephone switching capability and signalling can be used, and in this embodiment there is no need to reserve communication channels between the switch S1 and the controller 20. TCAP does not have to be the protocol used over link S1; for certain services such as 'Message Waiting Indicator', a mapping between the necessary TCAP signalling and ISDN signalling has been derived by ETSI; this approach is also possible for other services such as the routing services as described in the embodiments thus far, and a mapping between TCAP and ISDN signalling derived for these specific service types. This will have the advantage of being able to use an ISDN-capable PBX as the control point with a User-Network Interface rather than a Network-Network Interface. This last approach does however rely on the switch S1 having capability to support the ISDN interface as well as the Signalling System No. 7 interface, as the execution of the mapping on a call-by-call basis will take place at switch S1.

An additional embodiment also relating to FIG. 6 involves (and as used in the full intelligent network implementations described with reference to FIG. 3 and FIG. 4) the use of IN triggers and INAP queries over TCAP (or the AIN equivalent) within network 30, and the transmission of these over signalling link 21, but again using mapping of the INAP queries to ISDN signals at the controller 20, (the controller switch 20 requiring both Signalling System No. 7 and ISDN interfaces,) and then processing the ISDN signals at the controller 20 for a least-cost routing determination, before mapping the return signal back into the appropriate INAP/TCAP message and sending it back to switch S1, which must then be embodied as a full Service Switching Point.

Figure 7:
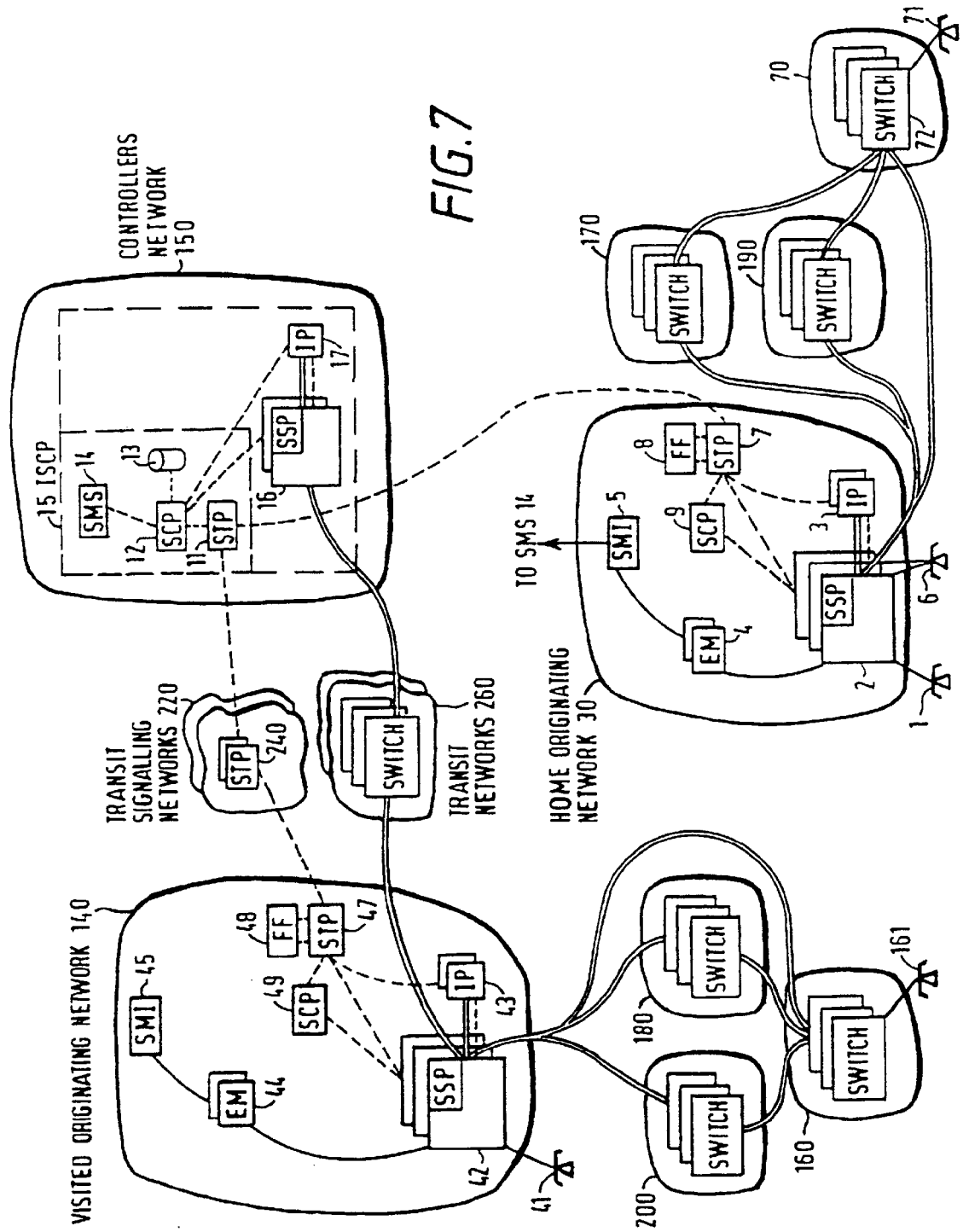
FIG. 7 is a detailed diagram of an embodiment of the present invention.

FIG. 7 illustrates another embodiment of the present invention which also comprises an intelligent network. This figure contains elements that operate in a similar fashion to FIG. 3. The numbering is consistent for ease of reference, and in the description of the items in this diagram that follows, the differences between the main elements are highlighted, and the description of previously described items has been shortened. As in FIG. 3, a subscriber 1 is connected to one of a plurality of switches 2 which each comprise a telephone exchange with SSP functionality.

Within the network 30 (which in this example acts as the Home Originating Network) there is provided EMs 4, SMI 5, STP 7, FF 8 and SCP 9. This network 30 is interconnected to transit networks 170 and 190, which each contain switching means, and terminating network 70 containing a plurality of switches 72, one of which is connected to subscriber 71 via an exchange line. This home network is the same in function to the network 30 shown in FIG. 3, however, there is an additional network element, Intelligent Peripheral (IP) 3. The primary function of an IP is to act as a subscriber interaction device, whose function is to interact usually with the calling subscriber, play announcements, and collect subscriber responses in the form of dialled digits/characters and sometimes speech recognition. Separate to the network 30 there is a controller's network 150 in which is provided a controller embodied as an Integrated Services Control Point (ISCP) 15 which contains an SCP 12, a database 13, a Service Management System 14, and a STP 11. Also in the controller's network 150 there is provide a Service Switching Point (SSP) 16 and an Intelligent Peripheral (IP) 17. As before, the filter/firewall functions inside the ISCP controller 15 (functions used for validation and/or authentication of signals from networks 30 or 140) are in this example embodied variously in the STP 11 and the SCP 12, although separate embodiments of these functions are possible.

The SCP 12 is also provided with directions from a director (which can comprise at least a user, a subscriber, a service provider, and a communications network operator— not shown) and these are entered into the subscriber (service) management system (SMS) 14. The subscriber (service) management system 14 is connected over an X.25 link to a service management interface (SMI) 5 within the originating network 30 and the service management interface (SMI) 5 is in turn connected over an X.25 link to network element managers (EM) 4. The element managers 4 are connected over X.25 links to the switches 2 in order to update the programmes and trigger points therein. As before, it will be apparent to those skilled in the art that such programming is also possible by means of the SSP switch 2 and the SCP 12 establishing a TCAP dialogue via the STP 7 and FF 8 and service trigger information being downloaded into SSP switch 2 again via STP7 and FF 8. Also noted in this figure is visited originating network 140, containing a plurality of switches 42, and to one of such switches is connected subscriber 41 via an exchange line. Network 140 contains an IP 43, EMs 44, a SMI 45, STP 47, FF 48 and SCP 49. This network is also connected to controller's network 150, but indirectly, via transit signalling networks 220 containing STPs 240. STPs 240 could be international gateway STPs whose function is to route signalling messages and also to convert different national implementations of Signalling System No. 7 into ITU standard Signalling System No. 7 signalling messages. Network 140 is interconnected with terminating network 160, which contains a plurality of switches 162, one such being connected to subscriber 161 via an exchange line. Network 140 is also interconnected with transit networks 180 and 200, each of which are in turn interconnected with terminating network 160. Signalling transit networks 220 are only required if there is no direct signalling link between network 140 and network 150, and may be embodied as specialised Signalling System No. 7 networks, or may be embodied as part of conventional transit networks 260.

If subscriber 1 moves away temporarily from the location to which their exchange line is connected, to the same physical location to which the subscriber 41's exchange line is connected, and that they wish to use their subscription to service provider 50's services whilst guesting at subscriber 41's exchange line (connected to the visited originating network 140), before they move, they direct the activation of a service with their service provider (who in this case acts as the controller under the direction of subscriber 1) 150 with the function 'divert all incoming calls to voice-mail until further notice'. Subscriber 41 allows their exchange line and handset to be used by subscriber 1 as a guest. Subscriber 1 'guesting' on subscriber 41's exchange line is shown on this figure as guest subscriber 1', although they are one and the same subscriber using the same subscription to service provider 150.

The operation of the services to enable guesting, the services whilst guesting takes place, and the services when guesting finishes will now be described in detail. The process is one of the more complex applications of intelligent network architecture. Subscriber 1, upon visiting at subscriber 41's exchange line, becomes subscriber 1'. Upon picking up subscriber 41's handset, subscriber 1' receives subscriber 41's dial-tone, and dials a telephone number provided by service provider 150 for the purpose of remote registration and deregistration; this number terminates on the service provider's switch 16, and a normal call is placed to this number from subscriber 41's line, and is switched by subscriber 41's local switch 42, through the visited originating network 140, into any transit network 260 selected by the same or other switching means 42 in carrier 140, and onward through any other transit network 260 selected by the first transit network, and so on, until switch 16 is reached, using normal call set-up procedures well documented in the prior art. Switch 16 has been preprogrammed such that all calls received at the remote access registration number activate an AIN trigger; the incoming call activates the trigger and a TCAP query is sent to SCP 12, which sends a return signal back to the SSP 16 with an instruction to connect the call to IP 17, and SCP 12 also sends an instruction to IP 17 to activate a specific subscriber interaction programme that has been pre-programmed into IP 17. This then plays voice prompts to subscriber 1' and collects dialled digit information; let us define the information thus collected from subscriber 1' as 'subscriber location registration information' (SLRI). The SLRI will include the account number and PIN of subscriber 1', and the calling line identity (CLI) of subscriber 41's exchange line (which if not received automatically through the networks will be prompted for), and any other information, such as the duration and type of the registration, that is required by the specific implementation within ISCP 15. IP 17 then sends the SLRI to SCP 12, which processes the SLRI. Upon successful processing of the SLRI, SCP 12 instructs IP 17 to activate another subscriber interaction programme for the purpose of selecting the services and/or service options (and/or priority levels over subscriber 41's services) to be provided to subscriber 1' on subscriber 41's line. IP 17 then collects further dialled digit information; let us define this new information thus collected from subscriber 1' as 'communications control programming information' (CCPI). The IP 17 then sends this CCPI to SCP 12 for processing; SCP 12 the processes the CCPI, and uses the processed SLRI to correctly address and send both processed CCPI and processed SLRI to switch 42 in carrier 140 via STPs 240 in signalling transit networks 220, STP 47 and FF48 (as well as using this information to alter the programming within SCP 12 such that subsequent processing of communications control signals associated with calls to and from subscriber 1' is changed accordingly). The processed SLRI and CCPI together contain the service trigger information which upon reaching switch 42 pre-programmes it such that services on the subscription subscriber 1' has with service provider 150 can be accessed through subscriber 41's line, selects the services that can be so accessed, and sets the parameters and options within the selected services. The SCP 12 may also send processed SLRI and processed CCPI to switch 2 in the home originating network to which subscriber 1 is connected; moreover, recordings made by the subscriber 1' during interactions with IP 17 may be used to update information contained in subscriber interaction programmes within IP 17 (such as voice-mail greetings). The information thus downloaded into switches 42 and 2 is stored in special storage areas within each switch to be used for such storage of temporary information, such that the pre-existing programming within each switch is not overwritten. (In this implementation of remote registration, the service trigger information has been downloaded from SCP 12, but in alternative implementations the SMS 14 could be used to download processed SLRI and processed CCPI to the correct switch 42 via SMI 45 and one of the EMs 44.) Subscriber 1' is then played a message to indicate that the services are now set up and that they should replace their handset; the IP 17 then sends a signal to SCP 12 that the subscriber interaction programme is complete, SCP 12 sends an instruction to the SSP 16 to disconnect the call from the IP 17, and the call from subscriber 41's line is torn down. Should subscriber 1' wish to make any change to their registration status or their selected services whilst guesting, they may now dial a special short code access number that has been preprogrammed into switch 42 as part of the processed SLRI, and this will re-connect them with IP 17 via switch 2 transit networks 260 and switch 16, at the same time passing a message to SCP 12 identifying the remotely registered subscriber 1' and activating a third subscriber interaction programme which plays a personalised welcome message and prompts for modified SLRI or modified CCPI. As before, the collected information is processed at SCP 12, and modifies the subsequent processing of communication control signals and may send modified processed SLRI and/or CCPI for loading into switch 42 (and may send further SLRI and/or CCPI into switch 2 in carrier network 30). Let us now assume that two services and one prioritisation were selected by subscriber 1':—

(a) A least-cost outgoing call service.
(b) All incoming calls destined for subscriber 1' to be announced on subscriber 41's telephone with a distinctive ringing tone, and diverted on busy or upon no answer for 6 ring cycles to voice-mail system operated by service provider 150 (which in this case is provided by SSP 16 and IP 17).
(c) No change made to subscriber 41's incoming calls.

Let us further assume that subscriber 41 has previously set up a voice-mail service with carrier 41 such that all incoming calls destined for subscriber 41 are diverted to carrier 140's voice-mail system upon busy and upon no answer for 6 ring cycles. Carrier 140's voice-mail system is implemented by IP 43. For ease of illustration, let us also assume the availability of end-to-end ISUP (IDSN User Part) signalling for call set-up and tear down through the composite network consisting of networks 30 70 140 150 160 170 180 190 200 and networks 260.

For an outgoing call from subscriber 1' on subscriber 41's line, after subscriber 1''s goes off-hook on subscriber 41's line, and the pre-requisite number of digits has been collected, switch 2 sends a TCAP query message to ISCP IS via STP 47 and STPs 240. ISCP 15 validates and authenticates the message in its STP 11 and SCP 12. Processing of the query message is carried out in SCP 12 to determine the lowest cost carrier and route, optionally using data in database 13, (this time using information on communications costs relating to networks 140 160 180 and 200) and a TCAP response message containing routing instructions for switch 2 is generated by SCP 12. This response message is then sent via STPs (11, 240 and 47) and FF 48, to switch 2, which then receives the response message, decodes it, and executes the routing instruction contained in the response message. The call is thus routed according to the lowest cost carrier and/or route.

For an incoming call destined for subscriber 1' from subscriber 6, the switch 2 connected to the exchange line of subscriber 1 receives the call attempt from subscriber 6. An AIN trigger is activated and a query is sent by switch 2 to ISCP 15 via STP 7. The programming in SCP 12 having now been modified by the processed SLRI and CCPI, ISCP 15 now sends a message via STP 7 and FF 8, to the switch 2 connected to the exchange line of subscriber 1; the call is then optionally dropped back to another specified switch 2 (see drop-back examples in reference to FIG. 4) and re-routed to subscriber 1' guesting at subscriber 41's line in carrier 140, again using information on communications costs associated with networks 30 140 and networks 260 to determine which combination of transit networks 260 should be used for the re-routing of the call from subscriber 6. The response message is sent to and received at switch 2 via STP 7 and FF 8, and the routing instruction is carried out by switch 2. ISCP 15 thus retains control of the call until such time as the call is completed. Subscriber 1' hears the distinctive ringing tone at subscriber 41's telephone, and answers the call. Were the call to be unanswered for more than 6 ring cycles, or were subscriber 41's line busy with another incoming call or outgoing call associated with subscriber 1' or an incoming call associated with subscriber 41, the AIN triggers in switch 42 loaded as part of the processed SLRI/CCPI would be activated and send a further query to ISCP 15, which would send a return message to the specified switch 2 and/or switch 42 to drop back and re-route the call from the specified switch 2 to SSP 16 and thence to IP 17. ISCP 15 would also send a message to IP 17 to activate the voice mail subscriber interaction programme. The call would thus be completed.

In the roaming scenario, drop-back becomes even more relevant, as it is possible for three countries to be involved; the incoming calling party could be located in a different country from the home location of the called party, and the called party could be guesting at another subscriber's line in a third country.

To deregister from subscriber 42's line and restore specified services to the exchange line of subscriber 1, subscriber 1' dials the short access code, follows the voice prompts to have subscriber location deregistration information (SLDI) collected followed by any desired changes to CCPI, and as a result, processed SLDI is sent to switch 42, and processed SLDI/CCPI is sent to switch 2. The processed SLDI deletes the programming from the special storage area in switch 42 which automatically re-instates any pre-existing programming. The processed SLDI/CCPI is sent to switch 2 and deletes the programming from the special storage area in switch 2 which automatically re-instates any pre-existing programming, and then modifies the pre-existing programming in accordance with the processed CCPI. (In practice this would probably be done in one operation.)

If subscriber 1 instead of guesting at subscriber 41's line was to guest at subscriber 6's line (ie intra-network guesting), network 30 would be both the Home Originating Network and the Visiting Network and it will be apparent to those skilled in the art how the above examples in relation to this FIG. 7 could be reworked. Similarly it is possible that subscriber 6's line is connected to the same local exchange switch 2, and similar reworking will show how this could operate according to the same principles of lowest cost routing.

The registration and deregistration process could be likened in principle to Home Location Register and Visiting Location Register interactions in a GSM roaming architecture. A more complex version of this first set of examples would be involved if an agreement were reached between carrier 140 and service provider 150 such that service provider 150 was able to use IP 43 in place of IP 17 for collection of SLRI, CCPI and SLDI; this would mean that specialised resource data such as subscriber interaction programming information could be downloaded and available for activation locally, local storage of voicemails greetings and messages may be facilitated, and other customised announcements may also be made more efficient. Similar mechanisms would be invoked for updating modification and deletion of 'guest-session specific' data and 'service specific' data, and the validation and authentication functions may as a consequence need to be extended to cover this special resource data. Detailed examples of the processes involved in these examples are not considered necessary as the examples are not of primary importance.

Where subscriber 41 now wishes to contract for service with service provider 150, the steps would run as follows:—
Subscriber 41 dials a service provisioning access number provided by service provider 150. This number terminates on the service provider's switch 16, and a normal call is placed to this number from subscriber 41's line, and is switched by subscriber 41's local switch 42, through the visited originating network 140, into any transit network 260 selected by the same or other switching means 42 in carrier 140, and onward through any other transit network 260 selected by the first transit network, and so on, until switch 16 is reached, using normal call set-up procedures. Switch 16 has been preprogrammed such that all calls received at the service provisioning access number activate an AIN trigger; the incoming call activates the trigger and a TCAP query is sent to SCP 12, which sends a return signal back to the SSP 16 with an instruction to connect the call to IP 17, and SCP 12 also sends an instruction to IP 17 to activate a specific subscriber interaction programme that has been pre-programmed into IP 17. This then plays voice prompts to subscriber 41 and collects dialled digit information; let us define the information thus collected from subscriber 41 as 'subscriber provisioning information' (SPI). The SPI may include the mailing and billing details of the subscriber 41, and account number and PIN of subscriber 1', and the calling line identity (CLI) of subscriber 41's exchange line (which if not received automatically through the networks will be prompted for), and any other information, such as the type of subscription requested. IP 17 then sends the SPI to SCP 12, which processes the SPI. Upon successful processing of the SPI, SCP 12 instructs IP 17 to activate another subscriber interaction programme for the purpose of selecting the services and/or service options to be provided to subscriber 41. The IP 17 then collects further dialled digit information; this new information thus collected from subscriber 41 is CCPI related to subscriber 41. The IP 17 then sends this CCPI to SCP 12 for processing; SCP 12 then processes the CCPI, and then signals to IP 17 to close the call, transferring the processed CCPI and SPI to the SMS 14. A fax or mailing is prepared and sent to subscriber 1 to authorise and authenticate the application. When the response form is received and authorised, a message is sent to the subscriber 41 with an alert indicator such as a custom dialling tone or perhaps a customised temporary announcement loaded into switch 42, to alert the subscriber to call the ISCP to enter further CCPI to activate the services. The interaction runs along similar lines, and on completion uses the processed SPI to correctly address and send the processed CCPI and processed SPI to switch 42 in carrier 140 via STPs 240 in signalling transit networks 220, STP 47 and FF48 (as well as using this information to alter the programming within SCP 12 such that subsequent processing of communications control signals associated with calls to and from subscriber 41 is changed accordingly). The processed SPI and CCPI together contain the service trigger information which upon reaching switch 42 pre-programmes it such that services on subscriber 41's subscription with service provider 150 can be accessed, selects the services that can be so accessed, and sets the parameters and options within the selected services. As before, recordings made by the subscriber 41 during interactions with IP 17 may be used to update information contained in subscriber interaction programmes within IP 17 (such as voice-mail greetings). The information thus downloaded into switch 42 may be stored in a special storage area within the switch to be used for such storage of secondary information, such that the pre-existing switch programming is not overwritten. As before, the service trigger information has been downloaded from SCP 12, but in alternative implementations the SMS 14 could be used to download processed SPI and processed CCPI to the correct switch 42 via SMI 45 and one of the EMs 44.) Should subscriber 41 wish to make any change to their service profile, they may now dial a special short code access number that has been preprogrammed into switch 42 as part of the processed SPI, and this will re-connect them with IP 17 via switch 2 transit networks 260 and switch 16, at the same time passing a message to SCP 12 identifying the subscriber 41 and activating another subscriber interaction programme which upon collecting the account number and PIN may play a personalised welcome message and prompt the subscriber 41 for modified CCPI. As before, the collected information is processed at SCP 12, and modifies the subsequent processing of communication control signals and may send modified processed CCPI for loading into switch 42.

An alternative embodiment can be derived for modifying CCPI such that when certain types of CCPI are requested, that these CCPI types are generated and processed directly at the local exchange 42 of the subscriber 41. This may necessitate more complex initial programming to be downloaded as part of the processed SPI, however this approach allows some service parameters and options to be altered at the local exchange without having to alter programming in the ISCP 15 and without subsequent redelivery or updating of processed CCPI from the ISCP 15 to the local switch 42; by subscriber 41 dialling a series of digits to invoke CLASS type features, the relevant parameters can be set within the switch 42. This type of service can usually be delivered by using the primitive announcement and digit collection capabilities available in most local exchange switches such as the Ericsson AXE 10 range and the GPT System X range. In these instances a subscriber will also want to have the means of using the ISCP 15 to alter the CLASS enabled parameters in their local exchange when guesting.

In the following examples of the interworking of control means, it will be apparent to those skilled in the art that such interworking functions may be gainfully employed in a 'guesting' or roaming scenario, and by interspersing these with global numbering, more elegant call processing will generally be possible, involving implementations are more efficient on the use of both signalling and network facilities.

Figure 8:
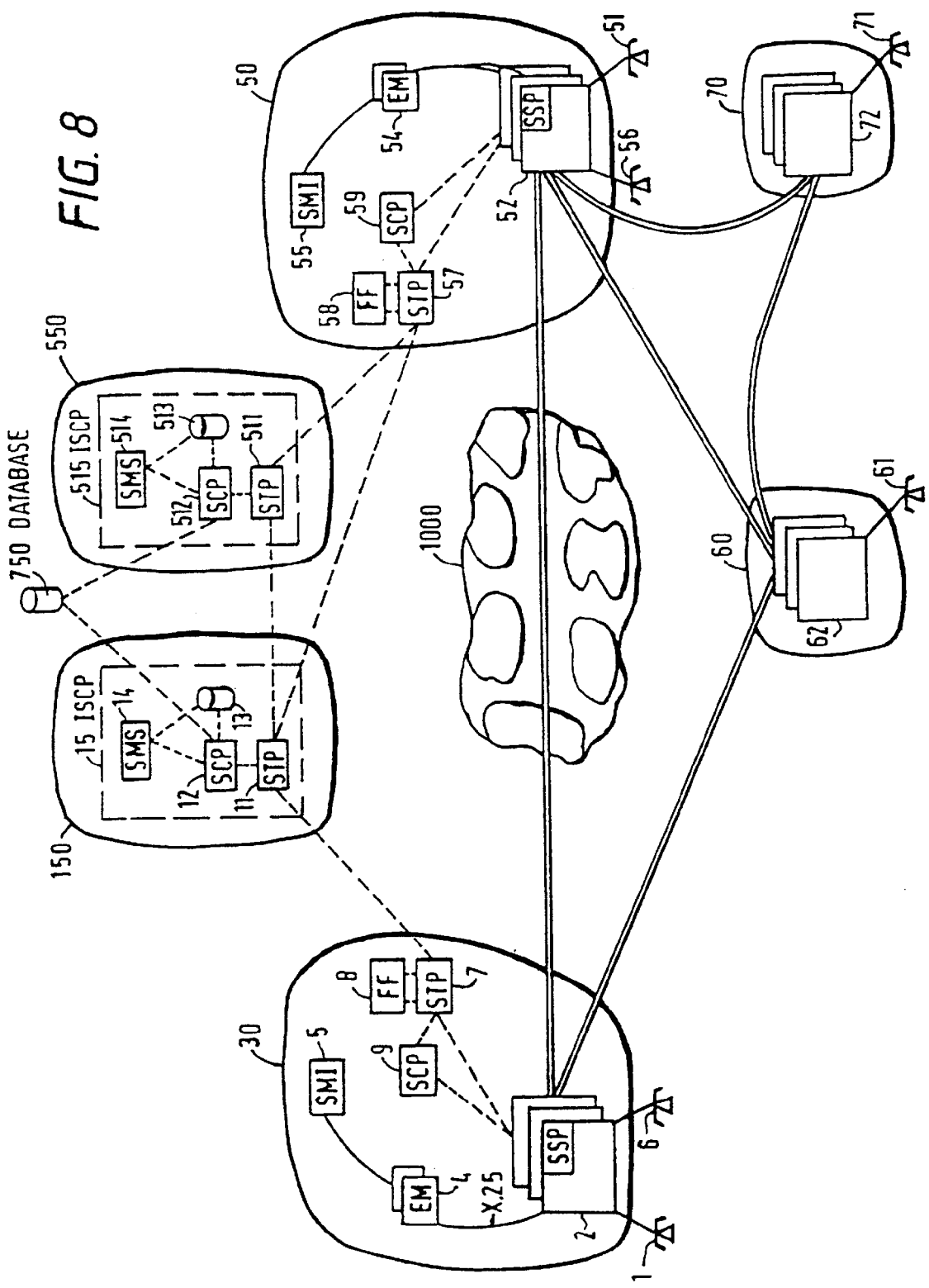
FIG. 8 is a detailed diagram of an intelligent network embodiment of the present invention.

FIG. 8 illustrates another intelligent network embodiment, which is used to describe further examples of application. In this figure, elements with the same numbers as FIG. 4 have the same functions here, and the additional elements of the drawing are now as follows; carrier 120 from FIG. 4 have not been included here and thus carrier 60 is connected directly with carrier 30. Service Provider 550 is shown; this has the capability of operating in a similar manner to carrier 150. It has an ISCP 515, connected via Signalling System No. 7 data links to ISCP 15 at STP 11, and to carrier 50's network at STP 57. Also shown is a plurality of transit carriers 1000, combinations of which can interconnect carrier 30 with carrier 50, and global number database 750, connected to ISCP 15 and ISCP 515 by means of Signalling System No. 7 data links. The first set of embodiments described with reference to FIG. 8 show possible methods of interaction between the control means embodied in ISCP 15 and the switching means embodied in SSP switch 2 in the network being controlled 30. In the first such embodiment, rather than each query in network 30 being directed to ISCP 15, the controller network 150 and the originating network 30 may reach a commercial agreement for a subset of the data and programming held in ISCP 15 to be held variously in SCP 9, SMI 5, STP 7 and a database (not shown) linked to SCP 9, which in some combination can form similar control means to those employed by service provider network 150; this second controller then acts under the effective directions or instructions of the ISCP 15. (Here, SMI 5 also doubles as an SMS function within carrier 30; although this could of course be embodied separately.) An example of how this could operate will now be considered. Presuming that at least network 30 is a major national network, with some hundreds of local exchange switches, in dispersed geographical areas, and that standard prices for element-based interconnect costs are available from this carrier 30 based to a degree on the distance from the originating point in the carrier network 30 to the point of interconnection, and also presuming that carrier 50 has a few tens of interconnect points with carrier 30, and that carrier 60 has a different geographical spread of points of interconnect with carrier 30, information on communication costs related to carriers 30, 50, 60 and 70 is stored at ISCP 15. It can be readily seen that this cost information will form a multi-dimensional table showing the costs of routing, via each possible carrier and/or route, call minutes from each switch 2 in carrier 30 to each other switch 2 in carrier 30, and to each switch 72 in destination network 70. (This then includes, as well as calls from network 30 to network 70, the possibility of transit delivery, via networks 50 or 60, of calls originating from subscribers connected to one switch 2 in carrier 30 and destined for subscribers connected to another switch 2 in carrier 30.) If it is assumed that this information on costs is processed from time to time in ISCP 15 to produce a subset of this information which will containing a multi-dimensional routing table showing the various preferred and alternative carriers and routings that represent the least cost for the originating and terminating combinations as described above. These selected primary and secondary carriers and routes for the different combinations of originating and destination exchanges can then be used in conjunction with the calling party number and the called party number to select the lowest cost and the next lowest cost carrier and/or route. This carrier and route information thus constitutes a set of instructions for routing calls depending on the calling party and called party addresses. Let us now presume that the controller network 150 and the originating network 30 may reach a commercial agreement for this set of 'global' instructions for processing of calls to be operated within the SCP 9 of carrier 30, and for updates to these instructions to be passed to SCP 9 by ISCP 15. The two variations of this embodiment are, firstly, that carrier 150 passes across solely the global routing instructions that it has generated by pre-processing, and secondly, that in addition, carrier 150 passes across the necessary service logic or code needed for the call-by-call processing. The subscriber 1 would set up and configure the services in a manner similar to that described in the other examples, provisioning and modifying services via ISCP 15, but the processing for the call-by-call selection of carriers and/or routes can now be effected by SCP 9 which now receives call-by-call queries from switch 2 and returns the responses. As before, the SCP 9 can collect billing data, and can pass the data across to ISCP 15 either on a call-by-call basis or alternatively on a batch basis. The service logic for executing the processing therefore operates within Carrier 30's network, but effectively operates under the control of Carrier 150. By these means, call-by-call internetwork signalling traffic can be reduced whilst still retaining control by Carrier 150.

In an alternative embodiment, the SCP 9 may be used as a 'directing filter', such that queries emanating from switches 2 are directed first to SCP 9, which executes some logic to validate the query messages, and then relays the processed queries to ISCP 15 via STPs 47 and 240. The return responses from ISCP 15 are also passed via STPs 240 and 47 through SCP 9, which in turn directs each response back to the switch 2 from which the query originated. In this example, the ISCP 15 does not have to address or be addressed by carrier 30's SSP's directly, automatically improving network security for carrier 30. Carrier 30's SCP 9 in this embodiment can act as a two-way firewall and filter, which may replace these functions in FF 8.

As a further alternative, the service logic is held at SCP 9, which on a call-by-call basis receives queries from a switch 2, and SCP 9 uses ISCP 15 as an external database to return the carrier and/or route selection information data to SCP 9.

These alternative embodiments equally well apply to the interactions between ISCP 15 and any network to which ISCP 15 sends and from which ISCP 15 receives signalling messages, queries or responses. All the above embodiments are possible for routing control of outgoing calls and for redirection of incoming calls routed from switch 2, as this is effectively the same as invoking a new outgoing call from switch 2. For redirection of incoming calls with drop back (as outlined in the examples described with reference to FIG. 4), the first embodiment of supplying pre-processed routing instruction will not work in isolation, as it is unlikely that in a practical implementation, sufficient cost data would be maintained within any single SCP to cover all the possible routing permutations from any origination point to any destination point. Other mechanisms for referral to external databases or SCPs will need to be used in practical implementations, and examples of these will now be given with reference to FIG. 8.

The next description shows a possible way the two ISCPs 15, 515 could interact in the delivery of an international incoming call drop-back scenario. For this example, let us assume networks 30 and 150 are situated in country A, service provider 550 and network 50 are in country B, and network 60 is in country C, and that end-to-end ISUP type signalling is possible. Let us further assume that subscriber 51 has activated a least-cost outgoing call routing service with service provider 550, and that subscriber 1 has activated a least cost incoming call diversion service with an international drop back option selected and has set the parameters of this service such that incoming calls are diverted to subscriber 61. To illustrate the interworking of the services, let us follow the progress of an incoming call from subscriber 51, who dials subscriber 1's telephone number. Switch 52 is triggered, a query sent to ISCP 515, which processes the query, and sends back a routing instruction to switch 52 with a carrier and/or route selection for switch 52, which then routes the call directly or via the selected carrier from transit carriers 1000, to switch 2 in carrier 30. The address of subscriber 51's IN service provider's ISCP 515 has been inserted into part of the call set-up signalling from switch 52. Switch 2 is triggered by the call attempt, queries ISCP 15, inserting ISCP 515's address into the query. ISCP 15 then launches a query to ISCP 515 to request routing information for the call to the new number of subscriber 61 (ISCP 15 does not carry data for outgoing call routing costs from country B.) ISCP 515 returns the data to ISCP 15, which sends a response back to switch 2, containing a drop-back instruction to drop the call back to switch 52 together with the new destination number and routing instructions. Switch 52 then reroutes the call as per the instructions provided by its own service provider, but requested via switch 2 and ISCP 15.

In another example, where a global number is used, and global number database 750 contains the global number, and the address of the IN service provider associated with the subscriber to the number. This time, subscriber 52 dials the global number of subscriber 51, and this time the query to ISCP 515 identifies by this global number that a second query has to be made to the global number database 750. This second query is launched, and the address of ISCP 15 is returned as the service provider associated with this particular global number. The ISCP 515 then launches a query to ISCP 15 to determine the actual termination number, and this is then returned to ISCP 515. ISCP 515 then processes the information and provides back in a response message to switch 52 the routing information for delivery of the call to subscriber 61, and switch 2 then dials the number.

Alternative scenarios may be derived by those skilled in the art for more complex services, for example where a subscriber to service provider 150's services may call a subscriber to the other service provider 550 and the IN interworking used to resolve service conflicts; alternatively the subscriber to carrier 150's services may request or be requested by a subscriber to service provider 550 to join an existing call to another party such as subscriber 71. For these purposes, the control means may interact with each other at the start of a call, during a call, at the start or end of other connections to the same call, or at the end of a call. Where multiple points of control exist, the selection of carriers as a function of cost is always carried out externally to the originating carrier network, even though parameters associated with other aspects of the processing or choosing service options may be stored in and altered within the originating carrier network. Some of the more complex embodiments and the examples of their use covered in the references to FIGS. 4, 7 and 8 will necessitate the more complex handling of billing information, with billing information transferring between carriers involved in a call, billing advice being requested and/or charging instructions in communications control signals at the start and/or end of a call, billing rates being supplied at the start or end of a call, and billing information or toll tickets and charging information being transferred between carriers and/or to the control point at the end of a call.

The processes described in these embodiments are for illustrative purposes, and will vary according to the implementation, however they serve to illustrate the principles involved in and associated with the present invention.

As can be seen from the foregoing embodiments the present invention provides the subscriber with the ability to have both outgoing and incoming calls processed to provide least cost or cost-based routing of calls over a plurality of carrier networks. This allows the customer increased choice in the selection of their carriers particular service/cost offering and would also allow for competition at the level of providing services. This will allow the consumer greater choice, lower cost and better services.

Although the present invention has been described hereinabove with reference to embodiments, it would be clear to a skilled person in the art that modifications are possible within the spirit and scope of the present invention.

What is claimed is:

1. A method of routing communications from and/or to a subscriber connected to an originating carrier, via a combination of communications carriers selected from a plurality of possible communications carriers, the method comprising the steps of:

receiving communications control signals associated with outgoing and/or incoming communications, from one or more communications switching means at one or more control means, at least one of which is external to said originating carrier;

processing said communications control signals at said control means in dependence upon third party directions, using information comprising information associated with the communications services of each communications carrier of said plurality of possible communications carriers and possible combinations thereof, to select a combination of communications carriers for routing communications based on said information, and to generate processed communications control signals for routing of the communication via said combination of communications carriers in accordance with the selection;

returning the processed communication control signals to said communications switching means; and switching the communications from and/or to the subscriber, to effect said routing of the communications via said selected combination of communications carriers in accordance with the processed communications control signals.

2. A method according to claim 1, wherein said processing step includes processing said communications control signals at respective ones of said more than one control means to select a respective communications carrier, thereby selecting said combination of communications carriers.

3. A method according to claim 1, wherein said information comprises information relating to at least one of the following:

cost, service offering, route congestion, possible routes between said communications carriers and other possible communications carriers of said plurality of possible communications carriers, routing chain information/communications path information, points of interconnection, originating and/or destination line information, originating and/or terminating exchange information, calling party number, calling party address, called party number, called party address, subscriber and/or user location information, time of day, directions from a director.

4. A method according to claim 3, wherein said communications switching means in said receiving step comprises communications switching means in said originating carrier.

5. A method according to claim 1, wherein said communications switching means in said receiving step comprises communications switching means in a one of said selected combination of communications carriers other than said originating carrier.

6. A method according to claim 1, wherein said processing step includes the step of selecting a route in at least one of the possible communications carriers for routing said communication to a destination.

7. A method according to claim 1, wherein said control means includes routing translation information for translating information in said communication control signals into routing data included in said processed communications control signals.

8. A method according to claim 1, wherein said processing step includes the steps of selecting an alternative combination of communications carriers and of generating alternative processed communications control signals for alternative routing of said communications, for use when said communications cannot be routed using the initially generated processed communications control signals.

9. A method according to claim 8, wherein said method includes receiving at said control means an indication that said communications cannot be routed using the initially generated processed communications control signals and wherein said alternative processed communications control signals are generated in response to said indication.

10. A method according to claim 8, wherein said processing step includes the step of selecting an alternative combination of communications carriers for routing of said communications and including alternative information on said alternative routing in the first or subsequent generated processed communications control signals.

11. A method according to claim 1, wherein said processing step includes the step of selecting the combination of communication carriers that incurs the lowest cost for routing said communications to said destination.

12. A method according to claim 11, wherein said processing step includes the step of selecting an alternative combination of communications carriers that incurs the next lowest cost to a previously selected combination of communications carriers for routing said communications when said communications cannot be routed using the initially generated processed communications control signals.

13. A method according to claim 1, including the step of a third party connecting with said control means, for providing said third party directions, causing communications control programming information to be received at said control means to set up or modify the processing of communications control signals to be performed by said control means.

14. A method according to claim 13, including the step of the operator of said control means setting up or modifying the processing to be performed thereby in dependence upon the directions from said third party.

15. A method according to claim 13, including the step of processing said communications control programming information in dependence on directions from the said third party, generating processed communications control programming information and causing said processed communications control programming information to be received at said communications switching means, causing in turn the programming or reprogramming of said communications switching means.

16. A method according to claim 13, wherein said third party comprises at least one of a user, a subscriber, a communications service provider and a communications network operator/carrier.

17. A method according to claim 1, wherein the step of receiving said communications control signals comprises the step of receiving at said control means, communications control signals associated with all outgoing and incoming communications from and/or to said subscriber.

18. A method according to claim 1, including the steps of programming said communications switching means to identify those communications to be processed by said control means; at the communications switching means, identifying said communications to be processed by said control means and directing communications control signals for any identified communications to said control means.

19. A method according to claim 1, wherein said step of processing said communications control signals by one of said control means includes the step of referring to one or more databases external to said control means.

20. A method according to claim 1, wherein said step of processing said communications control signals by said control means includes the step of referring to a database external to the said originating carrier containing routing and cost information relating to said possible communications carriers.

21. A method according to claim 1, including the step of validating and/or authenticating signals passed between said communications switching means and said control means.

22. A method according to claim 1, wherein a one of said switching means operates as a service switching point and/or said control means includes a service control point.

23. A method according to claim 1, wherein said communications control signals comprise Signalling System No 7 (SS7/CCS7) signals and/or ISDN signals.

24. A method according to claim 1, wherein a one of said control means communicates with and/or interworks with other like control means to provide multiple points of control associated with said communications.

25. A method according to claim 1, wherein a one of said control means and/or other like control means retains control of or an influence over said communications and/or information associated therewith and can carry out further processing upon receipt of further communications control signals.

26. A method according to claim 1, including the step of controlling the passage of billing information to billing means for the billing of said communications.

27. A method according to claim 26, wherein said billing information is directed to said control means and/or is used at said control means to validate and/or adjust information on communications costs at the said control means.

28. A method according to claim 7, wherein said control means sends or causes to be sent processed communications control signals to communications switching means other than said one or more communications switching means.

29. A method according to claim 28, wherein said processed communications control signals when received at said other communications switching means cause further communications control signals to be received at a one of said control means or at other like control means.

30. A method according to claim 29, wherein any of the said control means or other like control means may be external or internal to any of the communications carriers associated with said communications.

31. A method according to claim 1, wherein the processed communications control signals returned to a one of the communications switching means include control signals and/or routing information for one or more of said selected combination of communications carriers and/or instructions for said one of the communications switching means to pass on the said control signals and/or routing information to said one or more of said selected combination of communications carriers, and where the method includes the steps of:

said one of the communications switching means sending said control signals and/or routing information and/or like instructions to other than said one of the communications switching means in at least one of the said selected combination of communications carriers, which then route said communications in accordance with said control signals and/or routing information, and where so-instructed, pass on control signals and/or routing information and/or other like instructions to communications switching means in subsequent carriers of the said selected communications carriers.

32. A method according to claim 1, wherein the processed communications control signals returned to a one of the communications switching means include control signals and/or routing information for one or more of said selected combination of communications carriers and/or instructions for said one of the communications switching means to process and pass on said control signals and/or routing information to said one or more of said selected combination of communications carriers, and where the method includes the steps of:

said one of the communications switching means sending said control signals and/or routing information and/or like instructions to other than said one of the communications switching means in at least one of the said selected combination of communications carriers, which then route said communications in accordance with said control signals and/or routing information, and where so-instructed, process and pass on control signals and/or routing information and/or pass other like instructions to communications switching means in subsequent carriers of the said selected communications carriers.

33. A method according to claim 31, wherein said one of the communications switching means sends said control signals and/or routing information and/or instructions to other communications switching means in at least one of the said selected combination of communications carriers which then route said communications in accordance with the said control signals and/or routing information and where so-instructed process and pass on said control signals and/or routing information and/or pass other like instructions to communications switching means in subsequent carriers of the said selected communications carriers.

34. A method according to claim 32, wherein said one of the communications switching means sends said control signals and/or routing information and/or instructions to other communications switching means in at least one of the said selected combination of communications carriers which then route said communications in accordance with the said control signals and/or routing information and where so-instructed pass on said control signals and/or routing information and/or other like instructions to communications switching means in subsequent carriers of the said selected communications carriers.

35. A method according to claim 1, wherein a one of the said control means includes further switching means and the communications switching means in addition to sending communications control signals to the said one of the said control means also requests the routing of said communications to said further switching means.

36. A method according to claim 1, wherein the communications are routed by dropping back the communications to other switching means in said originating carrier or to any other communications switching means involved in the communications route from which the rerouting of said communications is to take place.

37. A method according to claim 24, wherein said and/or said other like control means control the selection of part of the route in a communications routing chain.

38. A method according to claim 24, wherein said and/or said other like control means control the selection of all carriers used in a communications routing chain thereby achieving end-to-end routing control.

39. A communications control system for routing communications from and/or to a subscriber connected to an originating carrier, via a combination of communications carriers selected from a plurality of possible communications carriers, the system being external to said originating carrier and comprising:

receiving means for receiving communications control signals associated with outgoing and/or incoming communications from one or more communications switching means;

processing means for processing said communications control signals in dependence upon directions from a third party and using information comprising information associated with the communications services of each of said plurality of possible communications carriers and possible combinations thereof, to select a combination of communications carriers for routing communications based on said information, and to generate processed communications control signals for routing the communications in accordance with the selection; and means for returning the processed communications control signals to said communications switching means to switch the communications from and/or to the subscriber and route the communications via the selected combination of communications carriers in accordance with the processed communications control signals.

40. A communications control system according to claim 39, operable as one of a plurality of communications control systems in a communications network, wherein said processing means is adapted to process said communications control signals at respective ones of said plurality of communications control systems to select a respective communications carrier, thereby selecting said combination of communications carriers.

41. A communications control system according to claim 39, wherein said information comprises information relating to at least one of the following:

cost, service offering, route congestion, possible routes between said communications carriers and other possible communications carriers of said plurality of possible communications carriers, routing chain information/communications path information, points of interconnection, originating and/or destination line information, originating and/or terminating exchange information, calling party number, calling party address, called party number, called party address, subscriber and/or user location information, time of day, directions from a director.

42. A communications control system according to claim 39, wherein said communications switching means comprises communications switching means in said originating carrier.

43. A communications control system according to claim 39, wherein said communications switching means comprises communications switching means in a one of said selected combination of communications carriers other than said originating carrier.

44. A communications control system according to claim 39, wherein said processing means is adapted to select a route in any of the possible communication carriers for routing communications to a destination.

45. A communications control system according to claim 39, wherein said processing means is adapted to include routing translation information for translating information in said communication control signals into routing data included in said processed communication control signals.

46. A communications control system according to claim 39, wherein said processing means is adapted to generate alternative processed communications control signals for routing communications for use when the communications cannot be routed using initially generated processed communication control signals.

47. A communications control system according to claim 46, wherein said receiving means is responsive to an indication that said communications cannot be routed using the initially generated processed communications control signals to generate said alternative processed communications control signals.

48. A communications control system according to claim 46, wherein said processing means is adapted to select an alternative carrier or combination of carriers for routing said communications and include the alternative information on said routing in the first or subsequent generated processed communication control signals.

49. A communications control system according to claim 39, wherein said processing means includes means for selecting the combination of communications carriers that incurs the lowest cost for routing said communications.

50. A communications control system according to claim 49, wherein said processing means is adapted to select an alternative combination of communications carriers that incurs the next lowest cost to a previously selected combination of communications carriers for routing said communications when said communications cannot be routed using the initially generated processed communications control signals.

51. A communications control system according to claim 39, including setup or modification means for setting up or modifying the processing to be performed by said processing means in dependence upon the directions from a third party.

52. A communications control system according to claim 51, including third party input means for inputting directions by said third party to said setup or modification means.

53. A communications control system according to claim 51, adapted to process said communications control programming information in dependence on directions from the said third party to generate processed communications control programming information and cause said processed communications control programming information to be received at said communications switching means for programming or reprogramming of said communications switching means.

54. A communications control system according to claim 39, wherein said receiving means is adapted to receive from the switching means communications control signals associated with all outgoing and incoming communications from and/or to the subscriber.

55. A communications control system according to claim 39, including means for programming said switching means to identify communications to be received by said receiving means for processing by said processing means.

56. A communications control system according to claim 39, including one or more databases external to said control means.

57. A communications control system according to claim 39, including database means external to said originating carrier containing routing and cost information relating to said possible communication carriers, and/or subscriber specific information to be used by said processing means for the processing of the communications control signals.

58. A communications control system according to claim 39, adapted to validate and/or authenticate signals passed between said communications switching means and said processing means.

59. A communications control system according to claim 39, wherein one or more of said communication switching means operates as a service switching point and/or said processing means includes a service control point in an intelligent network implementation.

60. A communications control system according to claim 39, wherein said receiving means and said returning means are adapted to receive and return, respectively, ISDN signals and/or Signalling System No 7(SS7/CCS7) signals as said communications signals.

61. A communications control system according to claim 39, including means for communicating and/or interworking with other like communications control systems to provide multiple points of control in a multi-carrier communications network.

62. A communications control system according to claim 39, wherein said communications control system and/or other like communication control systems are adapted to retain control of or an influence over said communications and/or information associated therewith and to carry out further processing upon receipt of further communications control signals.

63. A communications control system according to claim 39, including means for receiving and storing billing information from said communications network for the purpose of billing for communications associated with the processed communications control signals.

64. A communications control system according to claim 63, wherein said billing information is utilisable to validate and/or adjust information on communications costs.

65. A communications control system according to claim 39, wherein said communications control system is adapted to send or cause to be sent processed communication control signals to communications switching means other than said one or more communications switching means.

66. A communications control system according to claim 65, wherein said communications control system is adapted to receive further communications control signals upon said similar communications switching means receiving said processed communication control signals.

67. A communications control system according to claim 66, wherein said communications control system may be external or internal to any of the communications carriers associated with said communications.

68. A communications control system according to claim 39, wherein said communications control system is adapted to process the communications to include control signals and/or routing information for one or more of said selected combination of communications carriers and/or instructions for a one of said switching means to pass on said control signals and/or routing information to said one or more of said selected combination of communications carriers, whereby said one of the switching means sends said control signals and/or routing information and/or like instructions to other communications switching means in at least one of the said selected combination of communications carriers, which then route said communications in accordance with said further control signals and/or routing information.

69. A communications control system according to claim 39, wherein said communications control system is adapted to process the communications to include control signals and/or routing information for one or more of said selected combination of communications carriers used for routing said communications and/or instructions for one or more of said switching means to process and then pass on said control signals and/or routing information for one or more of said selected combination of communications carriers, whereby the switching means sends said control signals and/or routing information and/or like instructions to other switching means in at least one of said one or more of said selected combination of communications carriers, which then route said communication in accordance with said further control signals and/or routing information.

70. A communications control system according to claim 39, wherein said communications control system includes control switching means for receiving requests to route said communications to said control switching means and/or the routing of said communications.

71. A communications control system according to claim 39, adapted to control the selection of part of the route in a communications routing chain.

72. A communications control system according to claim 39, adapted to control the selection of all carriers used in a communications routing chain thereby achieving end-to-end routing control.

73. A method of routing communications from and/or to a subscriber connected to an originating carrier, via a combination of communications carriers selected from a plurality of possible communications carriers, the method comprising the steps of:

generating information for processing outgoing and/or incoming communications control signals in dependence upon third party directions and using information comprising information associated with the communications services of each of said plurality of possible communications carriers and possible combinations thereof at control means external to said originating carrier for selecting said combination;

passing the generated information to a controller in the originating carrier and/or other carriers used for said routing;

receiving communications control signals associated with said communications from a communications switching means at one or more of said controllers;

processing said communications control signals at said one or more controllers using the generated information to select a combination of communications carriers for routing communications to the destination based on the said information comprising information, and to generate processed communications control signals for routing the communications in accordance with the selected combination;

returning the processed communication control signals to said communications switching means; and switching the communications from and/or to the subscriber to route the communications via the selected combination of communications carriers in accordance with the processed communications control signals.

74. A method according to claim 73 wherein said processing step includes processing said communications control signals at respective ones of said more than one controllers using the generated information to select a respective communications carrier, thereby selecting said combination of communications carriers.

75. A method according to claim 74, wherein the independent control means includes a service control point and/or the controller is a service control point in an intelligent network implementation.

76. A communications control system for routing communications from and/or to a subscriber connected to an originating carrier to a destination via a combination of communications carriers selected from a plurality of possible communications carriers, the system being independent to said originating carrier and comprising:

means for generating information for processing outgoing and/or incoming communications control signals in dependence upon directions from a third party and using information comprising information associated with the communications services of each of said plurality of possible communications carriers and possible combinations thereof; and means for passing the generated information to a controller in the originating carrier;

whereby the controller receives communications control signals associated with communications from said communications switching means, processes said communications control signals using the generated instructions to select a combination of communications carriers for routing communications to the destination based on the said information comprising information and to generate processed communications signals for routing the communications in accordance with the selection, and returns the processed communications control signals to said communications switching means, and the communications from and/or to the subscriber are switched to route the communications via the selected combination of communications carriers in accordance with the processed communications control signals.

77. A communications control system according to claim 76, operable as one of a plurality of communications control systems in a communications network, wherein said system is adapted to process said communications control signals at respective ones of said plurality of communications control systems using the generated information to select a respective communications carrier, thereby selecting said combination of communications carriers.

78. A communications control system according to claim 76, wherein said instruction generating means and passing means includes a service control point adapted to communicate with said controller and/or wherein said controller comprises a service control point in an intelligent network implementation.

* * * * *